(12) United States Patent
Hosoya et al.

(10) Patent No.: US 9,184,821 B2
(45) Date of Patent: Nov. 10, 2015

(54) CONTROL METHOD OF RADIO COMMUNICATION SYSTEM, RADIO COMMUNICATION SYSTEM, AND RADIO COMMUNICATION APPARATUS

(75) Inventors: Kenichi Hosoya, Tokyo (JP); Kenichi Maruhashi, Tokyo (JP); Naoyuki Orihashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 345 days.

(21) Appl. No.: 13/505,992

(22) PCT Filed: Nov. 2, 2010

(86) PCT No.: PCT/JP2010/006471
§ 371 (c)(1),
(2), (4) Date: May 3, 2012

(87) PCT Pub. No.: WO2011/055536
PCT Pub. Date: May 12, 2011

(65) Prior Publication Data
US 2012/0220239 A1 Aug. 30, 2012

(30) Foreign Application Priority Data
Nov. 4, 2009 (JP) ................................ 2009-253119

(51) Int. Cl.
*H04B 7/06* (2006.01)
*H04B 7/08* (2006.01)

(52) U.S. Cl.
CPC .............. *H04B 7/0617* (2013.01); *H04B 7/086* (2013.01)

(58) Field of Classification Search
USPC ............................... 455/59, 69; 370/338, 342
See application file for complete search history.

(56) References Cited

U.S. PATENT DOCUMENTS

2007/0205943 A1 9/2007 Nassiri-Toussi et al.
2009/0252140 A1* 10/2009 Imaeda .......................... 370/342
(Continued)

FOREIGN PATENT DOCUMENTS

CN 1808942 A 7/2006
JP 3-239793 A 10/1991
(Continued)

OTHER PUBLICATIONS

Ismail Lakkis, et al., "IEEE P802.15 Working Group for Wireless Personal Area Networks (WPANS): TG3c Call for Proposals," 15-08-0355-00-003c, May 2008, pp. 1-43.
(Continued)

*Primary Examiner* — Junpeng Chen
(74) *Attorney, Agent, or Firm* — Sughrue Mion, PLLC

(57) ABSTRACT

When communication is to be performed between communication devices having a directivity control function, a plurality of antenna-setting pairs available for the communication are stored by an initial training, and the communication is started by using one of the plurality of antenna-setting pairs. When the communication quality is deteriorated, firstly, a training signal is transmitted while successively setting each one of the plurality of antenna-setting candidates determined in the initial training in a transmitting antenna of one of the communication devices (400), and the training signal is received in a state where a quasi-omni pattern is generated in a receiving antenna of the other communication device (500). In this way, in radio communication performing beam forming, it is possible to ensure the time synchronization between the communication devices when communication is disconnected or communication quality is deteriorated due to shielding or the like.

44 Claims, 14 Drawing Sheets

(56) References Cited

U.S. PATENT DOCUMENTS

| | | | |
|---|---|---|---|
| 2010/0215027 A1* | 8/2010 | Liu et al. | 370/338 |
| 2010/0330928 A1* | 12/2010 | Prasad et al. | 455/69 |
| 2011/0105032 A1* | 5/2011 | Maruhashi et al. | 455/59 |
| 2013/0084814 A1 | 4/2013 | Uno et al. | |

FOREIGN PATENT DOCUMENTS

| | | |
|---|---|---|
| JP | 11-252614 A | 9/1999 |
| JP | 2000-165959 A | 6/2000 |
| JP | 2000-307494 A | 11/2000 |
| JP | 2002-100917 A | 4/2002 |
| JP | 2003-332971 A | 11/2003 |
| JP | 2005-323189 A | 11/2005 |
| JP | 2006-245983 A | 9/2006 |
| JP | 2007-524272 A | 8/2007 |
| WO | 2008/090836 A1 | 7/2008 |

OTHER PUBLICATIONS

James F. Buckwalter, et al., "An Integrated Subharmonic Coupled-Oscillator Scheme for a 60-GHz Phased-Array Transmitter," IEEE Transactions on Microwave Theory and Techniques, Dec. 2006, pp. 4271-4280, vol. 12.

Kenichi Maruhashi, et al., "60-GHz-band LTCC Module Technology for Wireless Gigabit Transceiver Applications", IEEE International Workshop on Radio-Frequency Integration Technology, Digest, Dec. 2005, pp. 131-134.

Keiichi Ohata, et al., "1.25Gbps Wireless Gigabit Ethernet Link at 60GHz-Band", IEEE MTT-S International Microwave Symposium, Digest, Jun. 2003, pp. 373-376.

Katsuyoshi Sato, et al., "Channel model for millimeter wave WPAN", The 18th Annual IEEE International Symposium on Personal, Indoor and Mobile Radio communications (PIMRC'07), 2007.

Sayf Alalusi, et al., "A 60GHz Phased Array in CMOS", IEEE 2006 Custom Integrated Circuits Conference, Digest, San Jose, Sep. 2006, pp. 393-396.

Communication dated Feb. 8, 2014, issued by the State Intellectual Property Office of the People's Republic of China in corresponding Application No. 201080050268.6.

* cited by examiner

CONTROL METHOD OF RADIO COMMUNICATION SYSTEM, RADIO COMMUNICATION SYSTEM, AND RADIO COMMUNICATION APPARATUS

CROSS REFERENCE TO RELATED APPLICATION

This application is a National Stage of International Application No. PCT/JP2010/006471 filed Nov. 2, 2010, claiming priority based on Japanese Patent Application No. 2009-253119 filed Nov. 4, 2009, the contents of all of which are incorporated herein by reference in their entirety.

TECHNICAL FIELD

The present invention relates to a system that performs radio communication by adaptively controlling radio beams, and its control method. In particular, the present invention relates to a method for re-establishing a link (method for resuming communication) when communication is disconnected or communication quality is deteriorated due to a shielding obstacle or the like.

BACKGROUND ART

In recent years, use of radio devices using wideband millimeter waves (30 GHz to 300 GHz) has become increasingly widespread. The millimeter-wave radio technology has been expected to be used especially for high-rate radio data communication in the order of gigabit such as radio transmission of high-resolution images (for example, see Non-patent literatures 1, 2 and 3).

However, millimeter waves having high frequencies have a high rectilinear propagation property, and therefore they cause a problem in cases where radio transmission is to be implemented indoors. In addition to the high rectilinear propagation property, millimeter waves are significantly attenuated by a human body or a similar object. Therefore, if a person stands between the transmitter and the receiver in a room or a similar circumstance, no unobstructed view can be obtained, thus making the transmission very difficult (shadowing problem). This problem results from the fact that the propagation environment has been changed because of the increase in the rectilinear propagation property of the radio waves, which results from the increase in the frequency. Therefore, this problem is not limited to the millimeter waveband (30 GHz and above). Although it is impossible to clearly specify the transition frequency at which the propagation environment of the radio waves changes, it has been believed to be around 10 GHz. Note that according to recommendations of the International Telecommunications Union ("Propagation data and prediction methods for the planning of indoor radio communication systems and radio local area networks in the frequency range 900 MHz to 100 GHz," ITU-R, P1238-3, April, 2003), a power loss coefficient, which indicates the attenuation amount of a radio wave with respect to the propagation distance, is 22 for 60 GHz in an office, while it is 28 to 32 for 0.9 to 5.2 GHz. Considering that it is 20 in the case of free-space loss, the effects of scattering, diffraction, and the like are considered to be small in higher frequencies such as 60 GHz.

To solve the problem described above, Patent literature 2, for example, discloses a system in which a plurality of transmission paths are provided by installing a plurality of receiving units in the receiver, so that when one of the transmission paths between the transmitter and the receiving units is shielded, the transmission is carried out by another transmission path(s).

Further, as another method for solving the problem, Patent literature 3 discloses a contrivance to secure a plurality of transmission paths by installing reflectors on the walls and ceilings.

The method disclosed in Patent literature 2 cannot carry out transmission when shielding occurs in the vicinity of the transmitter or when all of the installed receiving units are shielded. Meanwhile, the method disclosed in Patent literature 3 requires users to give particular consideration to the configuration. For example, the reflectors need to be installed with consideration given to the positions of the transmitter and the receiver.

However, recent studies on propagation properties of millimeter waves have found out that reflected waves could be utilized without intentionally installing reflectors. FIG. 11 shows a configuration of a system using a wide-angle antenna, and FIG. 12 shows an example of a delay profile of a system using a wide-angle antenna like the one shown in FIG. 11 when the system is used indoors. In the system using the wide-angle antennas shown in FIG. 11, the received power of the dominant wave, which arrives faster than any other waves, is larger than that of any other waves as shown in FIG. 12. After that, although delayed waves such as the second and third waves arrive, their received power is smaller. These second and third waves are waves reflected from the ceiling and the walls. This situation is remarkably different from the propagation environment of radio waves having a lower rectilinear propagation property, such as a 2.4 GHz band used in wireless LANs (Local Area Networks). In 2.4 GHz band, it is very difficult to clearly separate waves in their directions-of-Arrival (DoAs) because of the effects of diffraction and multiple reflections. In contrast to this, in the millimeter waves having a high rectilinear propagation property, although radio waves are relatively clearly distinguished in their DoAs, the number of delayed waves is limited and their received-signal levels are small.

Therefore, when the direct wave is blocked, it is necessary to ensure a sufficient received-signal level by pointing a narrow beam having a high directive gain to a DOA of a reflected wave as shown in FIGS. 10A and 10B in order to continue the transmission by using the reflected wave. However, in order to free users from the need to give particular consideration to the configuration such as the relative positions of the transmitter and receiver, a beam forming technique capable of dynamically controlling a narrow beam is indispensable.

To implement beam forming, it is necessary to use an antenna having function of controlling its directivity. Typical antennas for such use include a phased array antenna. For millimeter waves having a short wavelength (e.g., 5 mm in the case of a frequency of 60 GHz), the phased array antenna can be implemented in a small area, and phase shifter arrays and oscillator arrays for use in those antenna arrays have been developed (for example, see Non-patent literatures 3 and 4). In addition to the phased array antenna, a sector-selectable antenna and a mechanically-direction-adjustable antenna may be also used to implement the antenna directivity control.

Further, as a technique for a different purpose from the beam forming using an antenna array, a direction-of-arrival (DOA) estimation techniques have been known. The DoA estimation techniques are used in, for example, radars, sonar, and propagation environment measurements, and used for estimating the DoAs and the power of radio waves to be received at antenna arrays with high accuracy. When a DoA estimation technique is used in propagation environment measurement with an installed radio wave source, an omni (nondirectional) antenna is often used as the radio wave source. For example, Non-patent literature 6 shows an example of such a technique.

CITATION LIST

Patent Literature

Patent literature 1: International Patent Application Publication No. WO 2008/090836
Patent literature 2: Japanese Patent Application Publication No. 2006-245986
Patent literature 3: Japanese Patent Application Publication No. 2000-165959
Patent literature 4: United States Patent Application Publication No. 2007/0205943

Non Patent Literature

Non-patent literature 1: K. Maruhashi et al., "60-GHz-band LTCC Module Technology for Wireless Gigabit Transceiver Applications", IEEE International Workshop on Radio-Frequency Integration Technology, Digest, pp. 131-134, December 2005
Non-patent literature 2: K. Ohata et al., "1.25 Gbps Wireless Gigabit Ethernet Link at 60 GHz-Band", IEEE MTT-S International Microwave Symposium, Digest, pp. 373-376, June 2003
Non-patent literature 3: J. F. Buckwalter et al., "An Integrated Subharmonic Coupled-Oscillator Scheme for a 60-GHz Phased-Array Transmitter", IEEE Transactions on Microwave Theory and Techniques, Vol. 12, pp. 4271-4280, December 2006
Non-patent literature 4: S. Alausi et al., "A 60 GHz Phased Array in CMOS", IEEE 2006 Custom Integrated Circuits Conference, Digest, pp. 393-396, San Jose, September 2006
Non-patent literature 5: I. Lakkis et al., "IEEE P802.15 Working Group for Wireless Personal Area Networks (WPANS): TG3c Call for Proposals", 15-08-0355-00-003c, May, 2008
Non-patent literature 6: K. Sato et al., "Channel model for millimeter wave WPAN", The 18th Annual IEEE International Symposium on Personal, Indoor and Mobile Radio communications (PIMRC'07), 2007

SUMMARY OF INVENTION

Technical Problem

In indoor millimeter wave systems, when one propagation path (link) is blocked and the radio transmission is to be continued by using other propagation paths, the following problem arises.

When the propagation path (link) that is actually used is switched, it is desirable to minimize the period during which the transmission is disconnected. Such minimization of the transmission disconnected period becomes especially an important requirement for, for example, the transmission of non-compressed images that requires a real-time capability. Meanwhile, when a reflected wave is used, it is necessary to increase the directive gain of the antenna and thereby to increase the reception strength by narrowing the antenna beam width.

However, the number of directions (steps) in which the search needs to be performed increases as the beam width becomes narrower. Therefore, the time necessary to search the beam directions and thereby set an optimal beam direction becomes longer, and therefore transmission-disconnected time also becomes longer. Accordingly, it has been desired to develop a beam direction setting method that can shorten the transmission-disconnected time even in such situations. It should be noted that the use of a device capable of temporally storing data is impractical because a huge buffer memory is required when the transmission-disconnected time becomes longer.

Characteristics of propagation paths between two communication devices are expressed by a channel response matrix. It has been known that if this channel response matrix is determined, the optimal combination of the antenna settings (hereinafter called "antenna-setting pair") of a transmitter and a receiver can be obtained by using SVD (Singular-Value Decomposition). However on the other hand, since SVD is complex and requires a long processing time, it is very difficult to implement SVD, for example, in a non-compressed image transmission apparatus that requires a high-rate processing capability.

Accordingly, Patent literature 4, for example, discloses a method for obtaining an optimal AWV (Array weight vector) with which the signal strength is maximized by adding a unitary matrix (e.g., Hadamard matrix) as phases of the antenna array and repeating the training of the antenna array of the transmitter and the training of the antenna array of the receiver. Although this method can reduce the processing time in comparison to SVD, it still requires a certain time to obtain the optimal AWV combination because the switching between the transmission and the reception needs to be repeatedly carried out.

Meanwhile, Non-patent literature 5 discloses a technique to optimize a transmitting/receiving beam direction (antenna setting) by gradually increasing the beam resolution. However, this technique also requires measuring communication quality for a number of combinations of the transmitting/receiving beam directions (antenna settings) while repeatedly carrying out the switching between the transmission and the reception, and thereby requiring a huge amount of time to obtain an optimal beam combination.

Further, this literature also brings up an idea called "quasi-omni (quasi-nondirectional) pattern" as a beam having the lowest resolution. This quasi-omni pattern means a pattern having a constant antenna gain over a very wide angle in the space around the transceiver, though it is not a complete omni (nondirectional) pattern. Since it is often very difficult to obtain a complete omni pattern in antenna arrays, this quasi-omni pattern is often used as a substitute in such cases.

In general, when a link is to be established at the initial stage, it would be acceptable if the acquisition of an optimal antenna setting requires a long time. However, in a case where a link needs to be re-established due to disconnection of the transmission on the previously-established link, a fast search for another optimal antenna-setting pair is required. Further, in the case of multipoint communication, a faster search for an optimal antenna-setting pair is also required because it requires re-establishment of a plurality of links.

Accordingly, the inventors of the present application have found out that it is effective to use a method for resuming communication in which: a plurality of antenna-setting pairs corresponding to a plurality of propagation paths available for the communication are obtained and stored by performing a training for initial link establishment; and when the communication is disconnected or the communication quality is deteriorated due to a shielding obstacle or the like, a new antenna-setting pair is selected from the stored reserve antenna-setting pairs and the communication is thereby resumed by using the selected antenna-setting pair. In this way, it is possible to reduce the communication disconnection time. However, when communication is disconnected, in particular, there is a possibility that the time synchronization between the communication devices will not be sufficiently maintained. In such cases, in order to re-establish the link in a fast and reliable manner, the time synchronization between the communication devices needs to be ensured before starting the procedure for selecting a new antenna-setting pair. If the time synchronization between the communication devices is ensured, it is possible to select a new antenna-setting pair having good quality by performing a communication quality test and the like between the communication devices after the time synchronization, and thereby to re-establish the link and resume the communication.

The present invention has been made based on the above-described findings by the inventors, and an object thereof is to provide a radio communication system, its control method, and a radio communication apparatus, capable of, when communication is disconnected or communication quality is deteriorated due to a shielding obstacle or the like in radio communication using beam forming, ensuring the time synchronization between communication devices so that the link can be re-established in a fast and reliable manner.

Solution to Problem

A method according to a first aspect of the present invention is a control method of a radio communication system including first and second communication devices. The first communication device is configured to control a transmission beam direction of a first transmitting antenna by changing transmitting-antenna setting and to control a reception beam direction of a first receiving antenna by changing receiving-antenna setting. Further, the second communication device is configured to control a transmission beam direction of a second transmitting antenna by changing transmitting-antenna setting and to control a reception beam direction of a second receiving antenna by changing receiving-antenna setting. The method according to this aspect includes the following operations (a) to (d):

(a) determining, by a training performed between the first and second communication devices, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for the second transmitting antenna, and a plurality of first receiving-antenna-setting candidates for the second receiving antenna;

(b) determining at least one first antenna-setting pair for the first transmitting antenna and the second receiving antenna, and determining at least one second antenna-setting pair for the first receiving antenna and the second transmitting antenna;

(c) detecting deterioration in communication quality of radio communication between the first and second communication devices using one of the at least one first antenna-setting pair and one of the at least one second antenna-setting pair; and (d) when the deterioration in communication quality is detected, performing at least one of the following operations (d1), (d2), (d3) and (d4):

(d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;

(d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;

(d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and (d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

A radio communication system according to a second aspect of the present invention includes first and second communication devices. The first communication device is configured to transmit a radio signal from a first transmitting antenna and to receive a radio signal by a first receiving antenna. The second communication device is configured to transmit a radio signal from a second transmitting antenna and to receive a radio signal by a second receiving antenna. Further, the first and second communication devices are configured to perform a process of determining a transmitting-antenna-setting candidate and a receiving-antenna-setting candidate used for radio communication in a cooperative manner. The determination process includes the following operations (a) to (d):

(a) determining, by a training performed between the first and second communication devices, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for the second transmitting antenna, and a plurality of first receiving-antenna-setting candidates for the second receiving antenna;

(b) determining at least one first antenna-setting pair for the first transmitting antenna and the second receiving antenna, and determining at least one second antenna-setting pair for the first receiving antenna and the second transmitting antenna;

(c) detecting deterioration in communication quality of radio communication between the first and second communication devices using one of the at least one first antenna-setting pair and one of the at least one second antenna-setting pair; and (d) when the deterioration in communication quality is detected, performing at least one of the following operations (d1), (d2), (d3) and (d4):

(d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;

(d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;

(d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and (d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

A radio communication apparatus according to a third aspect of the present invention is configured to perform a process of determining a transmitting-antenna setting candidate and a receiving-antenna setting candidate, used for radio communication with a corresponding device, in a cooperative manner with the corresponding device. The radio communication apparatus is equivalent to the first or second communication device included in the above-described radio communication system according to the second aspect.

A method according to a fourth aspect of the present invention is a control method of a radio communication system in which first and second communication devices perform radio communication with each other. The method includes:

(a) selecting a transmission-beam-direction candidate of the first communication device and a reception-beam-direction candidate of the second communication device by a first training performed between the first and second communication devices; and (b) when radio communication is disconnected between the first and second communication devices or when communication quality is deteriorated, performing a second training for combining a transmission-beam-direction candidate selected from the transmission-beam-direction candidate with a reception-beam-direction candidate of the second communication device.

A radio communication system according to a fifth aspect of the present invention is configured such that first and second communication devices perform radio communication with each other. Further, the system is configured to perform a first training for selecting a transmission-beam-direction candidate of the first communication device and a reception-beam-direction candidate of the second communication device. Furthermore, the system is configured, when radio communication is disconnected between the first and second communication devices or when communication quality is deteriorated, to perform a second training for combining a transmission-beam-direction candidate selected from the transmission-beam-direction candidate with a reception-beam-direction candidate of the second communication device.

Advantageous Effects of Invention

According to each of the above-described aspects of present invention, it is possible to provide a radio communication system, its control method, and a radio communication apparatus, capable of, when communication is disconnected or communication quality is deteriorated due to a shielding obstacle or the like in radio communication using beam forming, ensuring the time synchronization between communication devices so that the link can be re-established in a fast and reliable manner.

DESCRIPTION OF EMBODIMENTS

Specific exemplary embodiments to which the present invention is applied are explained hereinafter in detail with reference to the drawings. The same signs are assigned to the same components throughout the drawings, and duplicate explanation is omitted as appropriate for clarifying the explanation.

First Exemplary Embodiment

A radio communication system according to this exemplary embodiment includes transceivers 400 and 500 having a directivity-controllable antenna for beam forming. There is no particular restriction on the directivity control mechanism of the directivity-controllable antenna of the transceivers 400 and 500. For example, the directivity-controllable antenna of the transceivers 400 and 500 may be a phased array antenna, a sector-selectable antenna, or a mechanically-movable antenna.

Figure 2:
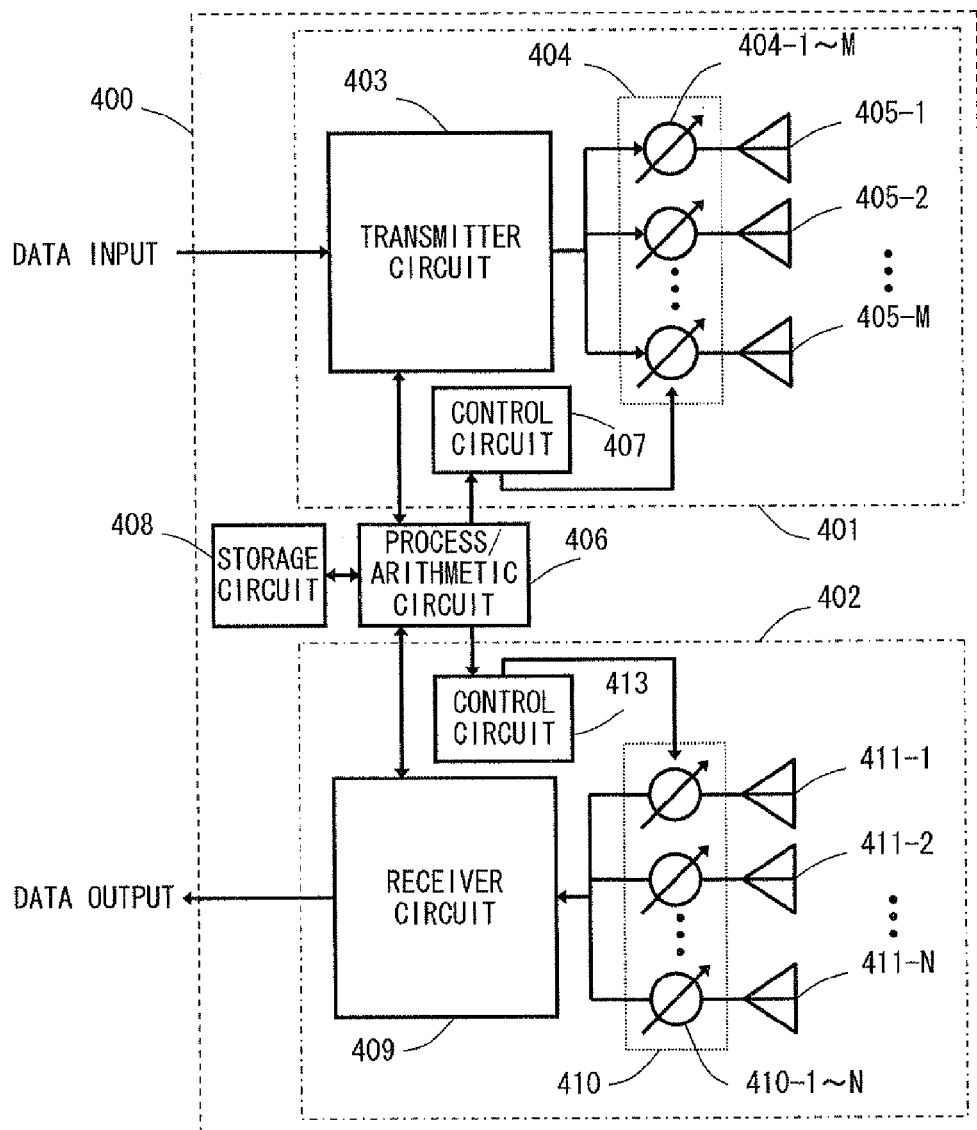
FIG. 2 shows an example of a device configuration used for beam forming, to which the present invention is applicable.

FIG. 2 shows an example of a configuration of the transceiver 400 having a phased array antenna as the directivity-controllable antenna (circuits inessential to the explanation of the operation are omitted). One antenna array includes M transmission radiating elements, and another antenna array includes N reception radiating elements. A transmitter 401 includes a transmitter circuit 403 receiving external data. The output of the transmitter circuit 403 is branched into M outputs and they are input to an antenna setting circuit 404. In the case of the phased array antenna, the antenna setting circuit 404 includes AWV (Array weight vector) control circuits 404-1 to 404-M. Each signal is changed in its amplitude or in its phase, or in both, and eventually output through the transmitting antenna array composed of the radiating elements 405-1 to 405-M. Each of the AWV control circuits 404-1 to 404-M can be implemented by, for example, series connection of an analog phase shifter and a variable-gain amplifier. In such a configuration, both the amplitude and phase of the signal are controlled in a continuous manner. If the AWV control circuits 404-1 to 404-M are implemented by digital phase shifters, only the phases of the signals are controlled in a discrete manner.

A process/arithmetic circuit 406 provides instructions about the setting of the antenna setting circuit 404 through a control circuit 407. By changing both or either of the amplitude and the phase of each signal, it is possible to control the direction, the width, or the like of the beam emitted from the transmitter.

Meanwhile, a receiver 402 has a reversed configuration to the transmitter 401. Signals received by a receiving antenna array composed of radiating elements 411-1 to 411-N are adjusted in both or either of the amplitude and the phase in AWV control circuits 410-1 to 419-N and combined. Then, a receiver circuit 409 receives the combined signal, and outputs data externally. As in the case of the transmitter 401, a process/arithmetic circuit 406 controls both or either of the amplitude and phase of each of the AWV control circuits 410-1 to 419-N.

Figure 3:
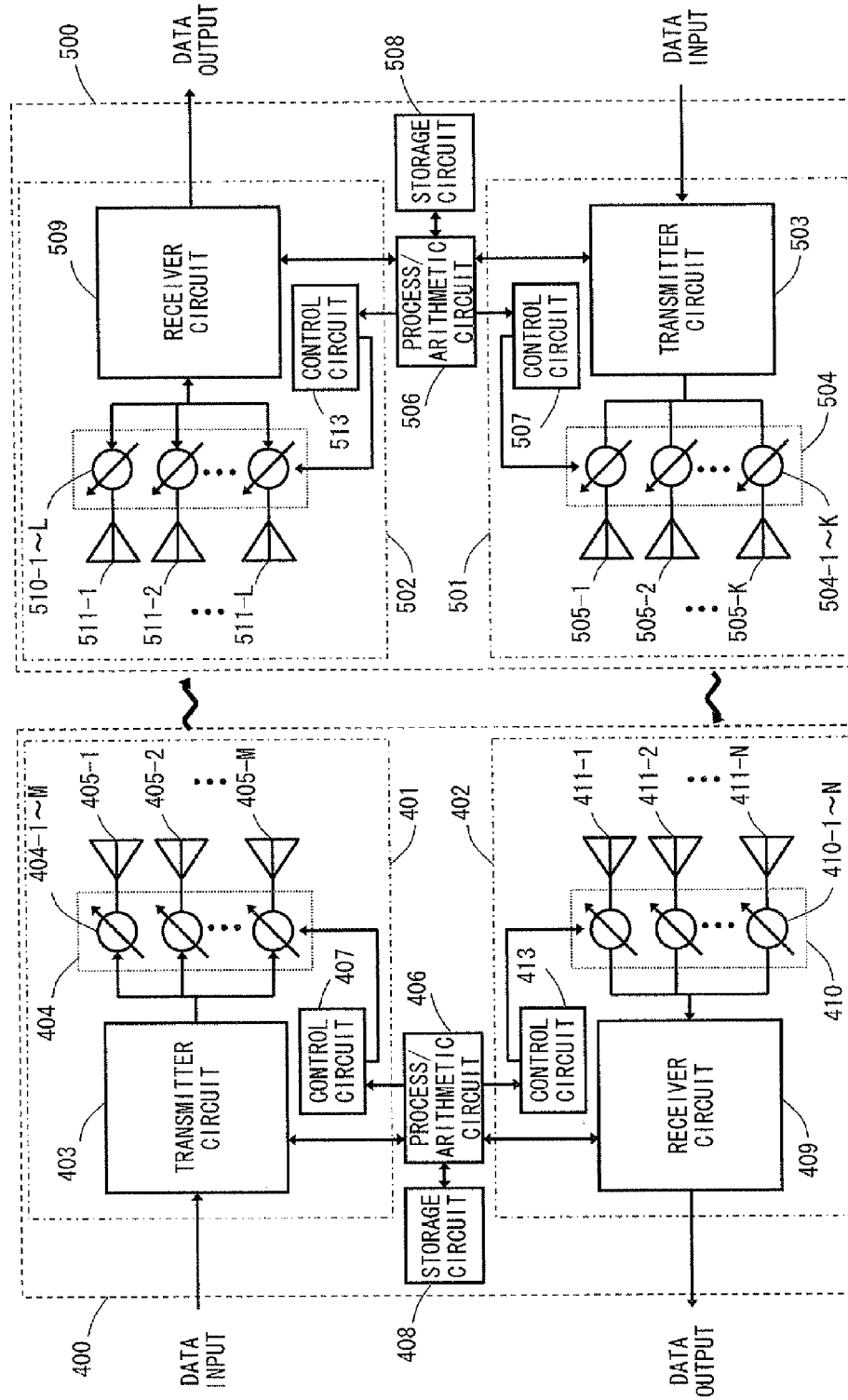
FIG. 3 is a schematic diagram for explaining a radio communication system including two communication devices.

FIG. 3 is a conceptual diagram of a radio communication system including two transceivers (400 and 500) each having the configuration shown in FIG. 2. As an example, the transceiver 500 has K transmission radiating elements and L reception radiating elements.

Figure 4:
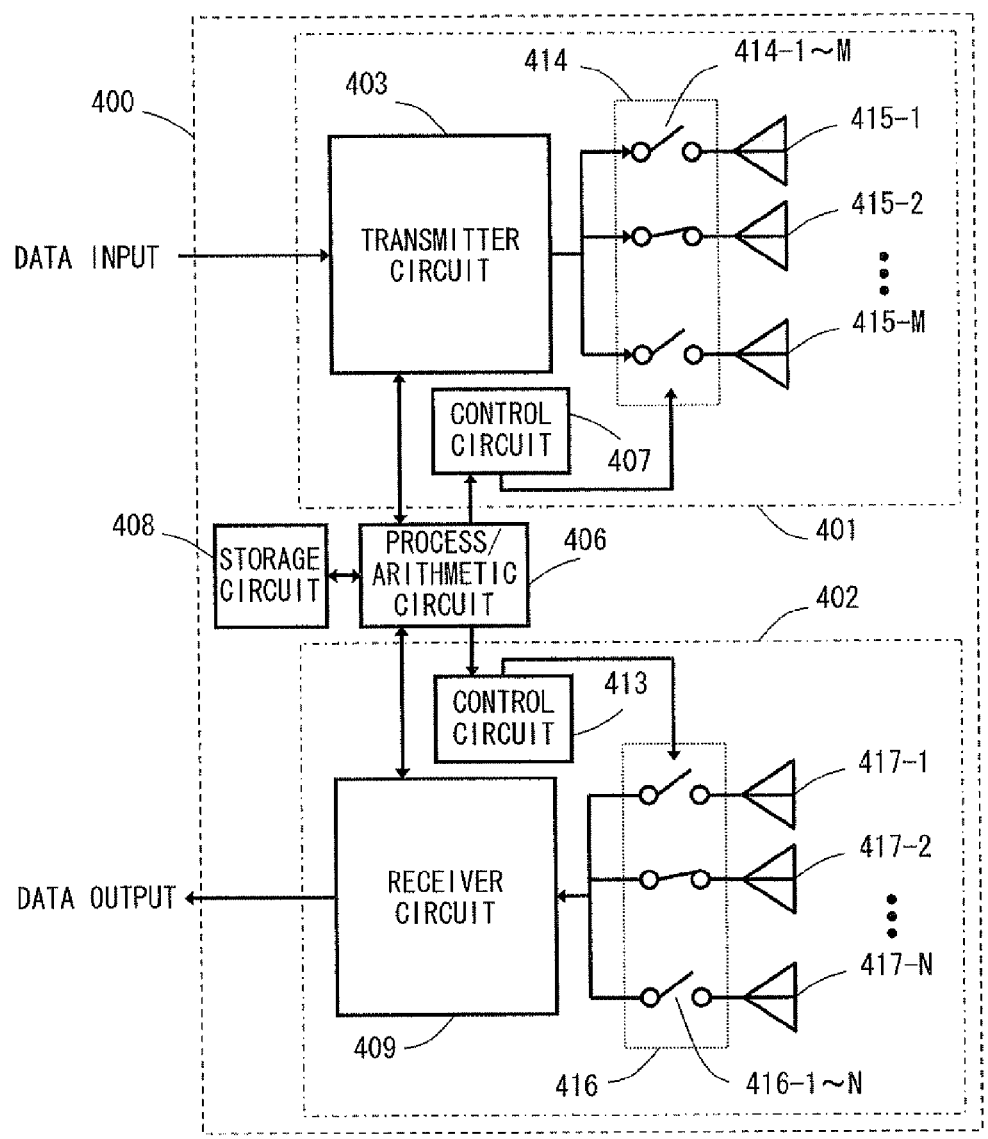
FIG. 4 shows an example of a device configuration used for beam forming, to which the present invention is applicable.

In FIGS. 2 and 3, a configuration example of a communication device including a phased array antenna as the directivity-controllable antenna is shown. However, communication devices including other types of antennas as the directivity-controllable antenna have been also known. FIG. 4 is a configuration example of a transceiver 400 including a sector-selectable antenna as the directivity-controllable antenna. In this case, radiating elements having strong directivity are used as the transmission radiating elements 415-1 to 415-M and the reception radiating elements 417-1 to 417-N, and these radiating elements are arranged to point different directions from one another. The antenna setting circuits 414 and 416 usually include switch elements 414-1 to 414-M and 416-1 to 416-N respectively. A beam is formed in the emitting direction of a radiating element whose switch is turned on. Therefore, it is possible to control the beam direction by changing the antenna setting by using the antenna setting circuits 414 and 416. The operations of the other circuits are similar to those of the circuits shown in FIG. 2.

Next, an overall radio control procedure in a radio communication system according to this exemplary embodiment is explained with reference to a transition diagram shown in FIG. 5. In states S12a and S12b in FIG. 5, the transceivers 400 and 500 perform a training to optimize their antenna setting circuits 404, 410, 504 and 510. Either the process/arithmetic circuit 406 or the process/arithmetic circuit 506, or both of the process/arithmetic circuits 406 and 506 in cooperation determine and obtain antenna-setting pairs (i.e. antenna-setting pair list) available for the communication. The method of determining antenna-setting-pair candidates performed in the states S12a and S12b is explained later. The obtained antenna-setting pairs are stored, in storage circuits 408 and 508, or in one of them, in the form of a data string. Note that although an example where the state S12a, in which a plurality of antenna-setting candidates are determined for each antenna, and the state S12b, in which combinations of antenna-setting candidates, i.e., antenna-setting pairs are determined, are separated states is shown in the figure, there may be cases where these two states cannot be separated. The states S12a and S12b are called "initial training" in this specification.

Note that as described above, the antenna-setting pair means a combination of an antenna setting for a transmitting antenna and an antenna setting for a receiving antenna. The antenna setting may be any setting information that defines a directivity pattern (e.g. beam direction or beam pattern) of a transmitting antenna or a receiving antenna. For example, when a phased array antenna is used as the directivity-controllable antenna as shown in FIG. 2, an AWV may be used as the antenna setting. Alternatively, when the directivity-controllable antenna is a sector-selectable antenna as shown in FIG. 4, the antenna setting may be On/Off setting of the switch elements 414-1 to 414-M. Further, for example, the antenna setting may be an identification number that is associated in advance with certain directivity, or may be an antenna setting value itself that determines the directivity such as an AWV.

In a state S13, one of the antenna-setting pairs obtained in the state S12b is selected. If necessary, a fine adjustment may be made to the antenna-setting pair in a state S14. Then, communication is performed in a state S15. The fine adjustment means a procedure for making a change to at least one of the two antenna-setting candidates included in the antenna-setting pair so that the communication quality is improved. For example, a change is made to at least one of the two antenna-setting candidates included in the antenna-setting pair so that the beam is changed around the beam direction corresponding to the selected antenna-setting pair. By doing so, antenna-setting candidates having a better communication quality may be found. The method of selecting the antenna-setting pair performed in the state S13 is also explained later. Note that the order of the states S13 and S14 may be replaced. That is, in the state S14, a fine adjustment may be made to the plurality of antenna-setting pairs obtained in the state S12b, and then one of the fine-adjusted antenna-setting pairs may be selected in the state S13.

During the communication performed in the state S15, the transceivers 400 and 500 monitor the communication state. For example, when the transceiver 500 is operated for reception, the communication quality may be measured in the receiver circuit 509 or the process/arithmetic circuit 506. For example, communication quality such as a received-signal level, a signal to noise ratio (SNR), a bit error rate (BER), a packet error rate (PER), and a frame error rate (FER) may be measured. Meanwhile, the monitoring of the communication state in the transceiver 400, which is operated as a transmitter at this time, may be implemented by measuring a reception status of a communication quality deterioration alert from the transceiver 500 or a reception status of a reception confirmation response (ACK). It should be noted that since publicly-known common techniques may be used as the communication state monitoring technique, detailed explanation of the monitoring technique in this exemplary embodiment is omitted.

When deterioration in communication quality such as disconnected communication is detected during the communication, the transceivers 400 and 500 start a training for re-establishing the link (S16a and S16b). In the state S16a, a communication quality test for all or some of the antenna-setting candidates determined in the state S12a is carried out while setting a quasi-omni pattern in the communication device on the other side. In the state S16b, a communication quality test for all or some of the combinations of antenna-setting candidates determined in the state S12a is carried out. Details of the link re-establishment training performed in the states S16a and S16b are explained later.

As a result of the communication quality test performed in the state S16a, if all the antenna-setting candidates are determined to be unusable, the procedure returns to the initial training S12a. This situation like this could occur when all the propagation paths are simultaneously blocked or when the communication device itself has moved.

In a state S17, an antenna-setting pair is selected based on the communication quality test result obtained in the state S16b. An antenna-setting pair having the best communication quality may preferably be selected. When the transceiver 500 is operated for reception, for example, the receiver circuit 509 or the process/arithmetic circuit 506 determine whether the communication quality is satisfactory or not by measuring a received-signal level, an SNR, or the like. If necessary, a fine adjustment may be made to the antenna-setting pair in the state S18. Then, the transceivers 400 and 500 return to the communication state (S15).

Figure 1:
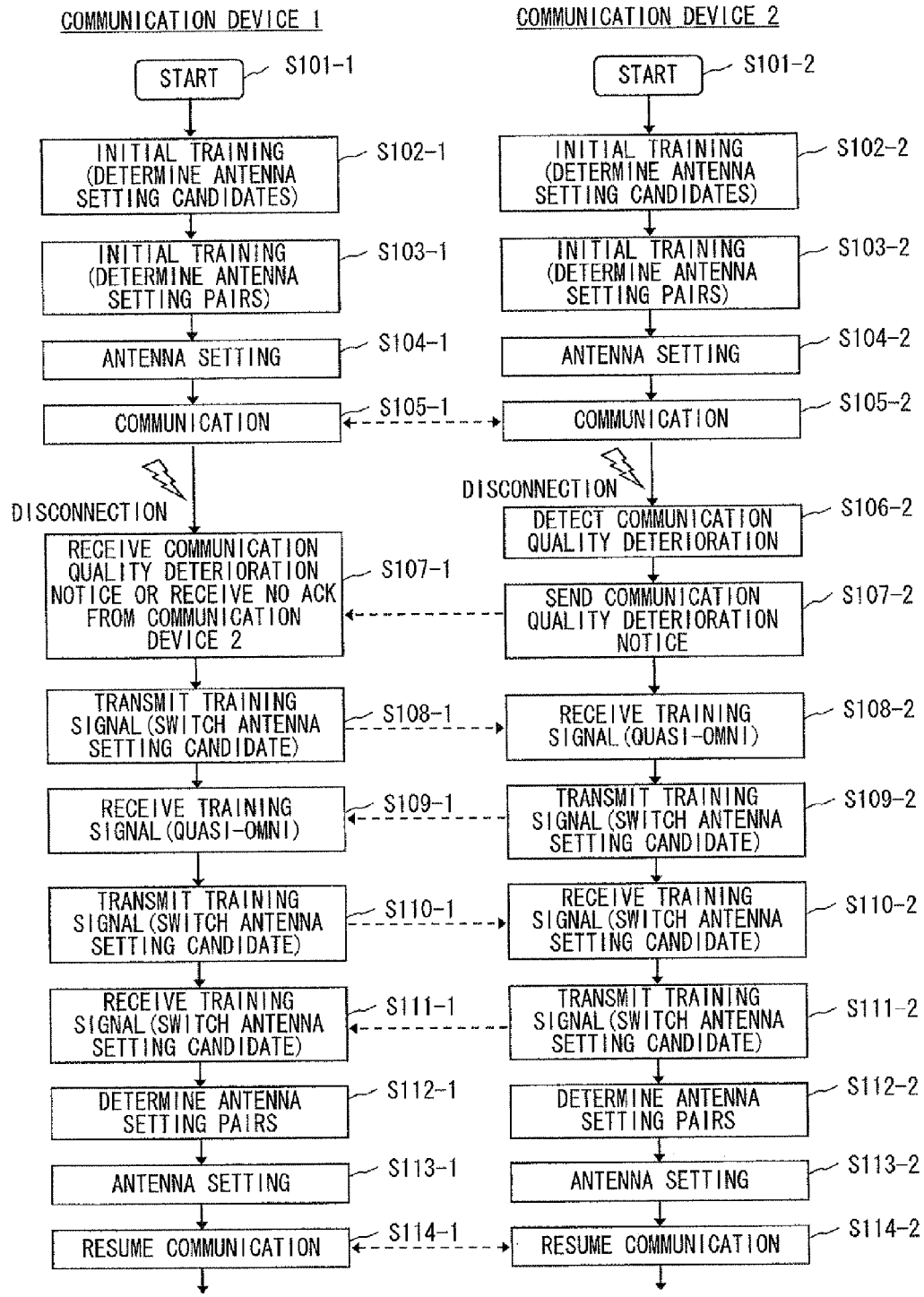
FIG. 1 is a sequence diagram showing an operation of a communication device performed before the link is re-established and the communication is thereby resumed in a radio control procedure according to a first exemplary embodiment of the present invention.
Figure 5:
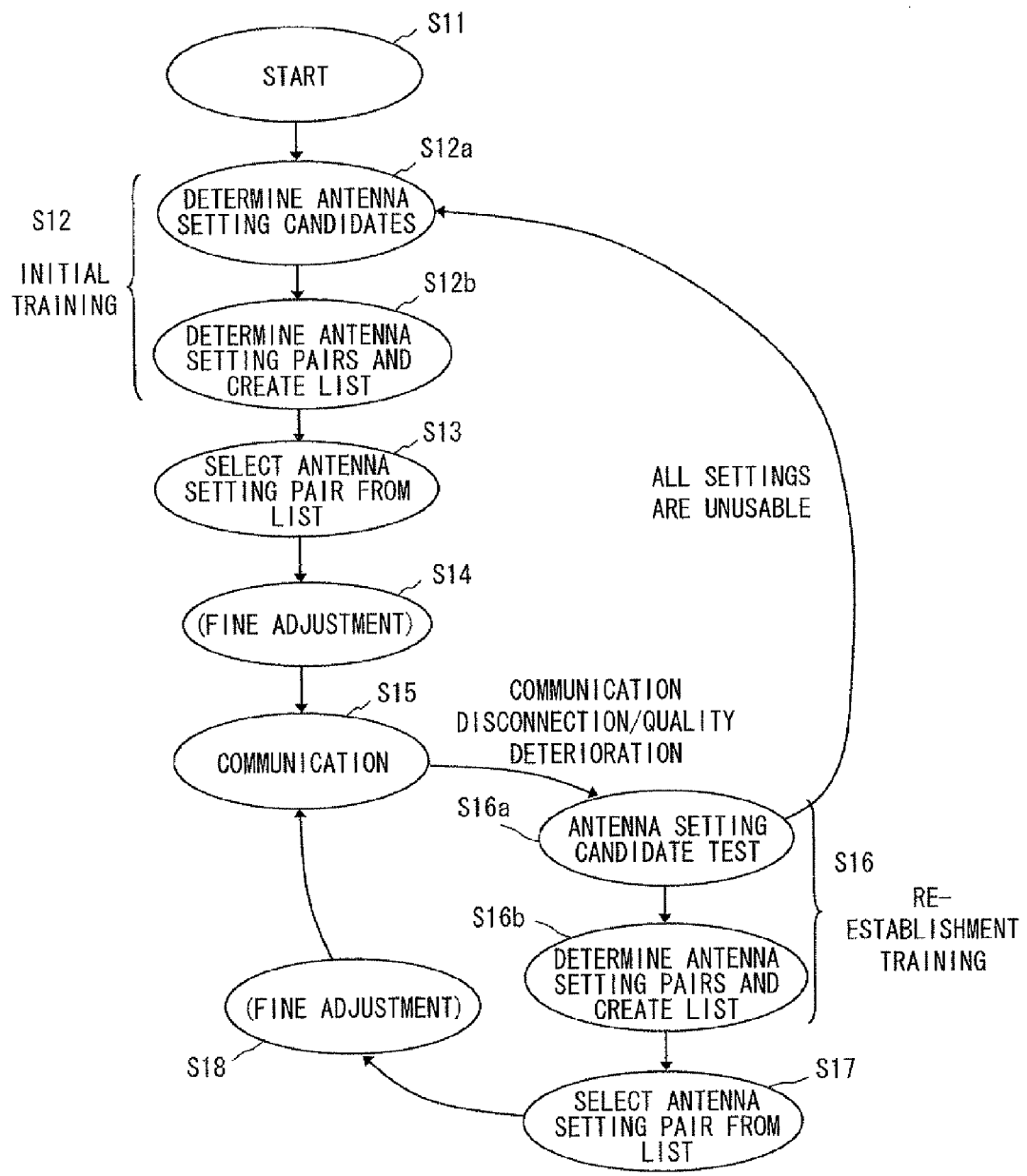
FIG. 5 shows transitions in a radio control procedure according to the first exemplary embodiment of the present invention.

Next, details of the link re-establishment training performed in the states 516a and 516b shown in FIG. 5 are explained. FIG. 1 is a sequence diagram showing a simplified example of these procedures. For the simplification, the transceiver 400 and the transceiver 500 are shown as "communication device 1" and "communication device 2" respectively in FIG. 1. In FIG. 1, the steps from the initial training to the start of communication (steps corresponding to the states S11 to S15 shown in FIG. 5) are also shown (S101 to S105). In the following explanation, a procedure and an operation are explained while simultaneously referring to the simplified sequence diagram shown in FIG. 1 and the configuration diagram of the radio communication system shown in FIG. 3.

Firstly, an initial training to start communication is explained. Each of the communication device 1 and 2 detects and determines a plurality of antenna-setting candidates available for the communication for its own transmitting and receiving antennas (S102). Next, for the pair of the transmitting antenna of the communication device 1 and the receiving antenna of the communication device 2, combinations of antenna-setting candidates (i.e. antenna-setting pairs) available for the communication are determined by combining antenna-setting candidates of the communication device 1 and the communication device 2 determined in the step S102. Similarly, for the pair of the receiving antenna of the communication device 1 and the transmitting antenna of the communication device 2, combinations of antenna-setting candidates determined in the step S102 (i.e. antenna-setting pairs) are determined (S103). In this exemplary embodiment, the procedure performed in the steps S102 and S103 is not limited to any particular procedure, and an example of the procedure is explained later. After that, the communication device 1 and the communication device 2 select one antenna-setting pair from the antenna-setting pairs determined in the step S103 (S104) and start the communication (S105).

A step S106 and the subsequent steps show a specific procedure that is performed before the communication is resumed when the communication is disconnected. For example, when transmission is disconnected due to the entry of a shielding obstacle to the propagation path when the communication device 1 is transmitting data to the communication device 2 (S105), the communication device 2 detects deterioration in the communication quality (i.e. communication disconnection in this example) (S106). The communication device 2 may detect the communication disconnection by detecting that the transmission has stopped before completing the reception of data having a certain length that has been notified in advance by the duration field. Meanwhile, the communication device 1 may detect the communication disconnection based on the fact that the acknowledgement (ACK) has not been replied from the communication device 2 at a scheduled time.

When deterioration in the communication quality occurs instead of the complete disconnection, the communication device 2 performing the receiving operation may detect the communication quality deterioration (S106-2) and send a notice of the communication quality deterioration to the communication device 1 (S107). The communication device 1 may detect the communication quality deterioration by receiving the deterioration notice (S107-1).

When communication disconnection or communication quality deterioration is detected as described above, the communication device 1 performs a transmitting operation in a step S108-1. In this process, the storage circuit 408, the process/arithmetic circuit 406, the control circuit 407, and the antenna setting circuit 404 of the communication device 1 work together and thereby switch the antenna setting of the transmitting antenna (e.g., antenna array 405-1 to 405-M) successively from one antenna setting to another among all or some of the antenna-setting candidates of the transmitting antenna of the communication device 1 determined in the step S102. Further, the transmitter circuit 403 also works together in that state. In this way, the communication device 1 transmits a training signal while successively switching the antenna setting and thereby changing the transmission beam direction.

At this point, the communication device 2 performs a receiving operation in a step S108-2. The storage circuit 508, the process/arithmetic circuit 506, the control circuit 513, and the antenna setting circuit 510 work together and thereby generate a quasi-omni pattern in its receiving antenna (e.g., antenna array 511-1 to 511-L). Further, the receiver circuit 509 also works together in this state. In this way, the communication device 2 receives the training signal transmitted from the communication device 1 with a fixed beam pattern, more specifically, with a quasi-omni pattern.

Next, the communication device 1 and 2 interchange their roles, and perform a similar process. That is, in a step S109-2, the communication device 2 transmits a training signal while switching the antenna setting of its transmitting antenna (e.g., antenna array 505-1 to 505-K) successively from one antenna setting to another among all or some of the antenna-setting candidates of the transmitting antenna of the communication device 2 determined in the step S102. At this point, in a step S109-1, the communication device 1 receive the training signal transmitted from the communication device 2 in a state where a fixed beam pattern, more specifically, a quasi-omni pattern is being generated.

The antenna-setting candidates that are set in the transmitting antenna in the steps S108 and S109 may include all or some of the antenna-setting candidates determined in the step S102, or may include only the antenna-setting candidates that are used for the antenna-setting pairs formed in the step S103 among the antenna-setting candidates determined in the step S102.

The purpose of carrying out the steps S108 and S109 is explained hereinafter. When communication is disconnected, the data exchange between the communication devices is temporarily stopped. Therefore, there is a possibility that the time synchronization (timing synchronization) between the communication devices cannot be sufficiently maintained. Meanwhile, there is a possibility that among the antenna-setting pairs determined in the step S103 or the antenna-setting candidates determined in the step S102, there are some antenna settings that do not satisfy a certain communication quality any more in addition to the one that was actually used when the communication disconnection has occurred. For example, when the communication disconnection is caused by a shielding obstacle, there is a possibility that the shielding obstacle blocks plural propagation paths at the same time. The situation like this could cause, for example, such a situation that even if a new antenna-setting pair different from the one that was used at the time of the communication disconnection is selected from the antenna-setting pair list obtained in the step S103 and a communication quality test is performed for the selected antenna-setting pair, the test signal cannot be received and the acknowledge also cannot be received. In this case, after a certain time has elapsed, a test will be performed again after switching to another antenna-setting pair or a similar measure will be taken. However, these measures waste the processing time.

In contrast to this, in this exemplary embodiment, when the communication quality has deteriorated, a training signal is transmitted/received between the two communication devices in a state where one of the communication devices is set with a fixed beam pattern (e.g., quasi-omni pattern) and the other communication device switches the antenna setting (e.g. beam direction or beam pattern) successively from one antenna setting to another among the plural antenna-setting candidates. In this way, unless all the antenna-setting candidates are unusable at the same time, it is possible to make sure that data exchange is performed and thereby to establish the time synchronization. Once the time synchronization is restored in this manner, it becomes possible to perform a communication quality test according to a combination of antenna-setting candidates with stability. Further, since the total number of the antenna-setting candidates is usually reduced to a sufficiently small number in the step S102, the process in the steps S108 and S109 can be performed in a short time.

As described above, in this process, it is also possible to determine an antenna setting(s) that do not satisfy a certain communication quality any more in addition to the one that was actually used when the communication disconnection has occurred.

The explanation is continued by referring to FIG. 1 again. In a step S110, trainings are performed between the antenna-setting candidates of the transmitting antenna of the communication device 1 and the antenna-setting candidates of the receiving antenna of the communication device 2 on a round-robin basis. Similarly, in a step S111, trainings are performed between the antenna-setting candidates of the transmitting antenna of the communication device 2 and the antenna-setting candidates of the receiving antenna of the communication device 1 on a round-robin basis. Details of the procedure of these round-robin trainings are explained later. By performing these trainings, combinations between antenna-setting candidates (i.e. antenna-setting pairs) are found, and they are arranged in descending order of their communication quality (e.g., descending order of received power).

The antenna-setting candidates for which the round-robin trainings are to be performed may include all the antenna-setting candidates determined in the step S102 or the candidates that are used for the antenna-setting pairs in the step S103. Further, the antenna setting that was used at the time of communication disconnection may be excluded. Furthermore, the antenna settings that do not satisfy a certain communication quality in the communication test in the steps S108 and S109 may be excluded.

The communication device 1 and 2 select antenna settings at the same ranks from the antenna-setting pairs that are stored in the storage circuits 408 and 508 by the above-described method, and resume the communication. For example, in a step S112, the rank of the antenna setting to be used may be sent from the communication device 1 to the communication device 2. The antenna setting rank that is sent in this step may be both or either of the rank of the pair of transmitting and receiving antennas of the communication devices 1 and 2 and the rank of the pair of transmitting and receiving antennas of the communication devices 2 and 1. Further, though it is omitted in the figure, both or either of these ranks may be sent from the communication device 2 to the communication device 1. Further, when the order of antenna setting ranks that are used for the communication is determined in advance, the transmission and reception of the rank of the antenna setting to be used may be omitted. In general, it is desirable to make such an arrangement that a setting pair having the best communication quality is used. The communication device 1 and 2 set the antenna setting circuits 404, 410, 510 and 504 according to the transmitted or received antenna-setting pair rank (S113) and resume the communication (S114).

Figure 7A:
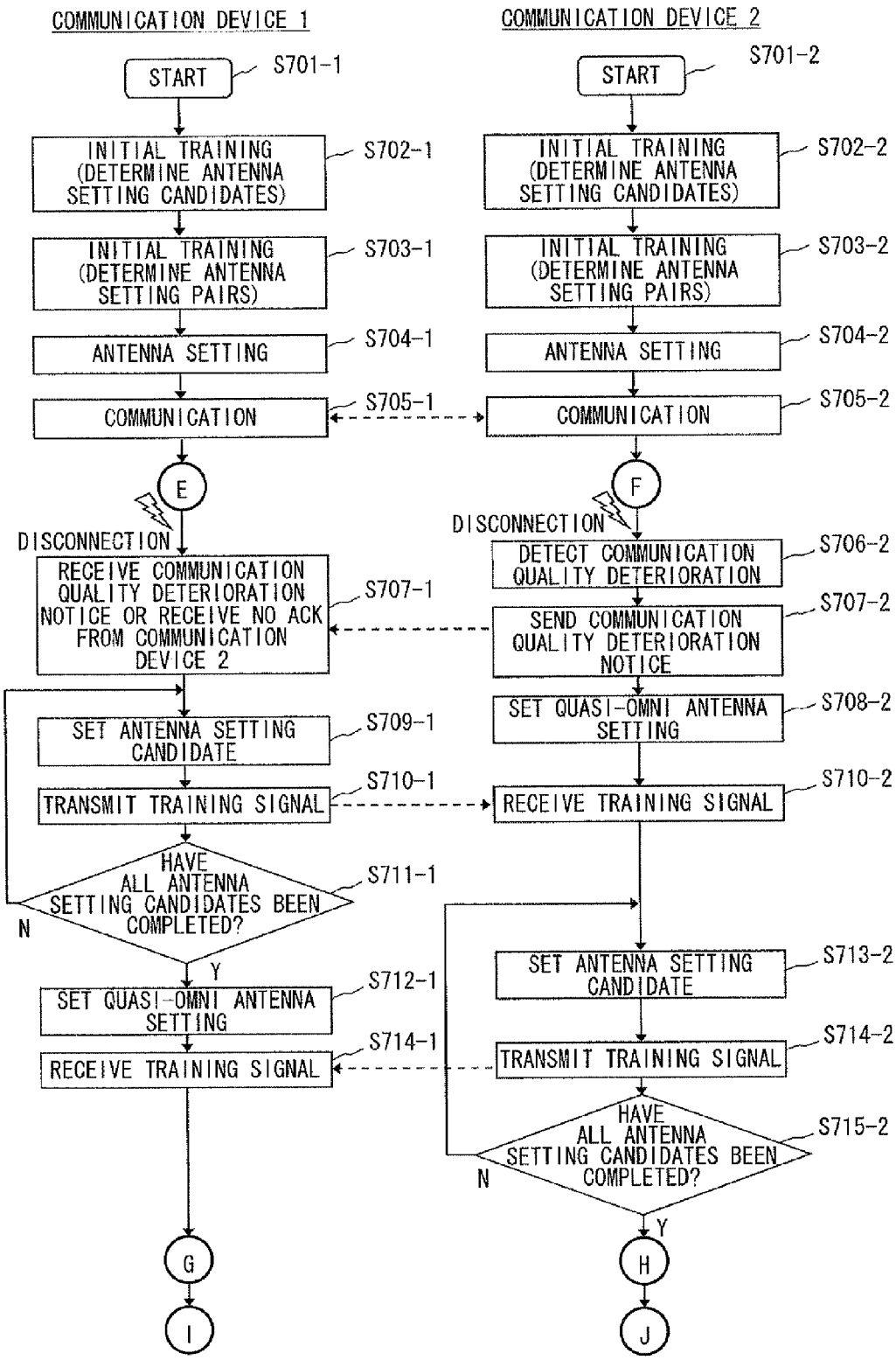
FIG. 7A is a sequence diagram showing an operation of a communication device performed before the link is re-established and the communication is thereby resumed in a radio control procedure according to the first exemplary embodiment of the present invention.
Figure 7B:
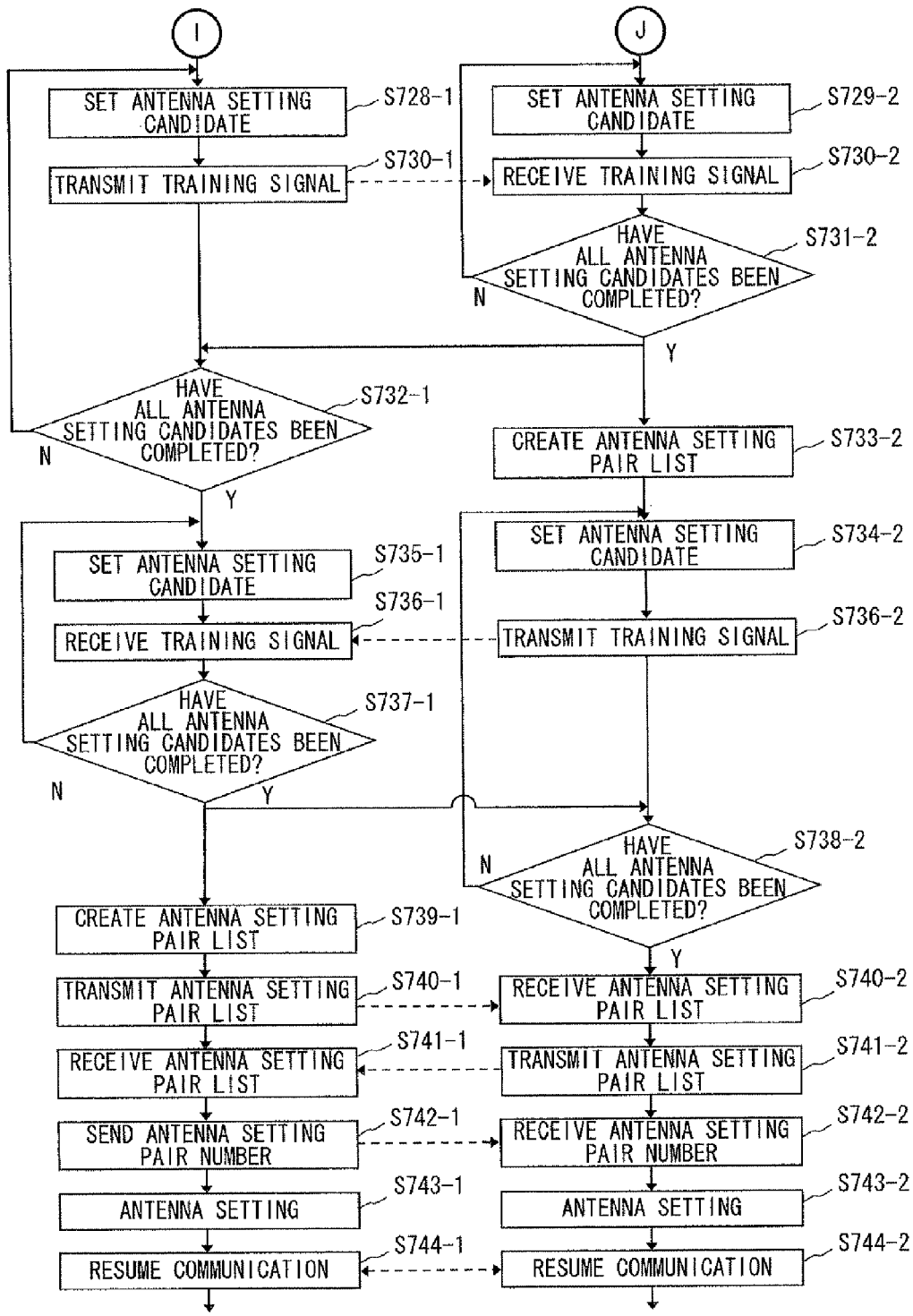
FIG. 7B is a sequence diagram showing an operation of a communication device performed before the link is re-established and the communication is thereby resumed in a radio control procedure according to the first exemplary embodiment of the present invention.

Next, the operation that is explained above with reference to the simplified sequence diagram shown in FIG. 1 is explained in a more detailed manner. FIGS. 7A to 7B are a sequence diagram showing the procedure of the simplified sequence diagram shown in FIG. 1 in a more detailed manner. The operation of the part that is simplified in FIG. 1 is explained hereinafter.

Steps S701 to S707 in FIG. 7A are similar to the steps S101 to S107 in FIG. 1. Steps S708 to S711 show an example of the procedure performed in the step S108 shown in FIG. 1 in a more detailed manner. Firstly, the communication device 2 sets the receiving-antenna setting with values for generating a quasi-omni pattern (S708-2). The communication device 1 repeatedly transmits a training signal (S710-1) while changing the transmitting-antenna setting (S709-1) until signal transmissions in all or some of the antenna settings detected and determined in the step S702 have been completed (S711-1). The communication device 2 receives each training signal and antenna setting identification number (S710-2).

The steps S712 to S715 show an example of the procedure performed in the step S109 shown in FIG. 1 in a more detailed manner. These operations are similar to those in the above-described steps S708 to S711 except that the roles of the communication device 1 and 2 are interchanged, and therefore their explanation is omitted.

Steps S728 to S732 show an example of the procedure performed in the step S110 shown in FIG. 1 in a more detailed manner. In these steps, round-robin trainings (i.e. communication quality tests) are performed between all or some of the transmitting-antenna-setting candidates of the communication device 1 and all or some of the receiving-antenna-setting candidates of the communication device 2 determined in the step S702.

Firstly, the communication device 1 sets the transmitting-antenna setting to the first antenna setting among the antenna-setting candidates (S728-1) and sends a training signal (S730-1). The communication device 2 repeatedly receives a training signal (S730-2) while successively setting the receiving-antenna setting to each one of the antenna-setting candidates (S729-2) until signal receptions in all the antenna-setting candidates have been completed (S731-2). The above-described procedure is repeated until the procedure has been completed for all or some of the transmitting-antenna-setting candidates of the communication device 1 (S732-1).

The steps S734 to S738 show an example of the procedure performed in the step S111 shown in FIG. 1 in a more detailed manner. In these steps, round-robin trainings (communication quality tests) are performed between all or some of the transmitting-antenna-setting candidates of the communication device 2 and all or some of the receiving-antenna-setting candidates of the communication device 1 determined in the step S702. These operations are similar to those in the above-described steps S728 to S732 except that the roles of the communication device 1 and 2 are interchanged, and therefore their explanation is omitted.

In general, the number of antenna-setting candidates detected and determined in the step S702 is reduced to a sufficiently small number in advance in comparison to the number of antenna settings for the beam direction scanning that is usually performed in the initial training. Therefore, even when round-robin trainings are performed, they do not cause any significant increase in the total training time.

By performing the above-described round-robin trainings, combinations between antenna-setting candidates (i.e. antenna-setting pairs) are found, and they are arranged in descending order of their communication quality (e.g., descending order of received power). The communication device 1 and the communication device 2 select antenna settings at the same ranks from the antenna-setting pairs obtained by the above-described method, and resume the communication (S739 to S744).

The procedure described above in this exemplary embodiment is merely an example. For example, there is flexibility in the order of those steps, the communication devices that perform various processing and calculation, the content of transmitted and received information, and so on. Therefore, various cases where these matters are different from those shown in the above exemplary embodiment are also included the scope of the present invention. Further, in the explanation, a group of two or more processes is sometimes handled as one step as in the case of the step S108-1 shown in FIG. 1, for example, for the sake of convenience. The order of the processes constituting the step like this may be interchanged between steps. For example, such cases where each process constituting the step S108 shown in FIG. 1 is interchanged with each process constituting the step S109 in a temporal manner are also included the scope of the present invention.

According to this exemplary embodiment, it is possible to re-establish the link in a fast and reliable manner when the communication is disconnected or the communication quality is deteriorated. In particular, even when communication is disconnected and the time synchronization between the communication devices is not sufficiently maintained, it is possible to ensure the time synchronization between the communication devices and thereby to re-establish the like in a reliable manner by performing a training for re-establishing the link while setting a quasi-omni pattern in one of the communication devices and changing the antenna setting (e.g. beam direction or beam pattern) of the other communication device successively form one antenna setting to another among a plurality of antenna-setting candidates available for the communication.

The following is supplementary explanation for the reason why this method is effective for millimeter waves or microwaves that are higher than or equal to around 10 GHz and have a high rectilinear propagation property when the method is used indoors. The propagation paths that can be used for radio communication are limited. That is, only the direct wave and reflected waves from certain objects such as walls, windows, and furniture can be used. Therefore, angles at which waves (signals) should be emitted for respective propagation paths or angles at which waves (signals) should be received are widely different from one wave (signal) to another. Meanwhile, when propagation paths having a low rectilinear propagation property such as a 2.4 GHz microwave band are used, it is necessary to give consideration to effects caused by multiple scattering and diffraction. Therefore, in general, directional antennas are not used. Therefore, situations are different between communication using microwaves and millimeter waves that have higher than or equal to around 10 GHz and communication using microwaves in the order of 2.4 GHz. It should be noted that there are some examples of development of adaptive antennas having directivity for the purpose of eliminating interferences even in the field of communication using 2.4 GHz microwaves. However, even when an adaptive-type directional antenna is used, it is relatively easy to ensure satisfactory communication quality at the angle of the direct wave or angles close to the direct wave in the 2.4 GHz band because diffraction effects can be expected in the 2.4 GHz band.

In indoor communication using beam forming in millimeter-wave bands, it is necessary to take the following properties into consideration. As described above, the number of reflected waves other than the direct wave is limited. Further, even if a certain direct wave or a reflected wave is blocked by an obstacle (e.g., human body), there is no correlation between the blocked certain wave and other waves. Therefore, as described with this exemplary embodiment, in millimeter wave communication systems, it is possible to secure reserve beam directions while performing communication in a beam direction having the best communication condition. Meanwhile, when the frequency is lower than around 10 GHz, contribution of multiple reflections and diffractions on the communication quality is large. Therefore, even if a directional antenna is used, the propagation state of the reserve beam directions varies depending on the presence/absence of an obstacle. That is, there is a high possibility that a received signal state of a reserve beam direction, which has satisfactory quality when no obstacle exists, is changed due to the presence of an obstacle. Therefore, it is difficult to obtain an advantageous effect of this exemplary embodiment in 2.4 GHz microwave communication and the like.

Figure 10A:
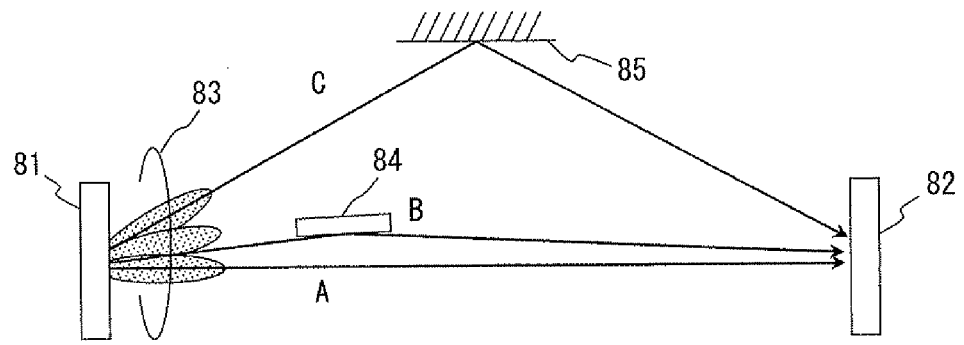
FIG. 10A is a figure for illustrating a radio wave propagation state where propagation paths are created as a result of local reflections of radio signals (when radio waves are not blocked) in radio control procedure according to the first exemplary embodiment of the present invention.
Figure 10B:
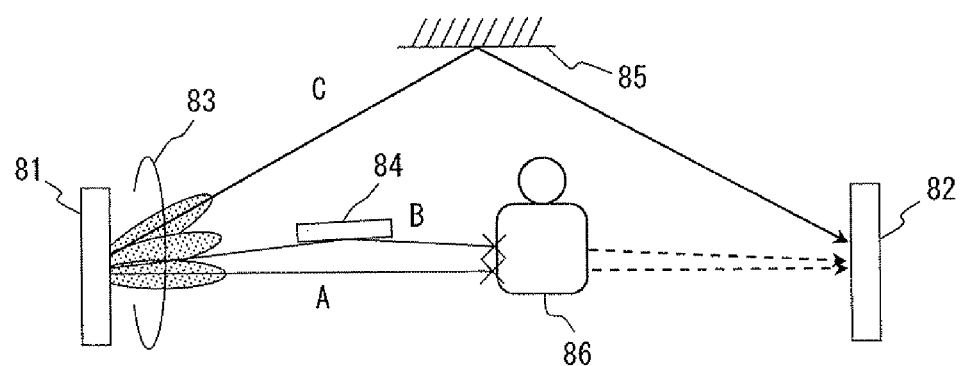
FIG. 10B is a figure for illustrating a radio wave propagation state where propagation paths are created as a result of local reflections of radio signals (when radio waves are blocked by a human body) in radio control procedure according to the first exemplary embodiment of the present invention.
Figure 11:
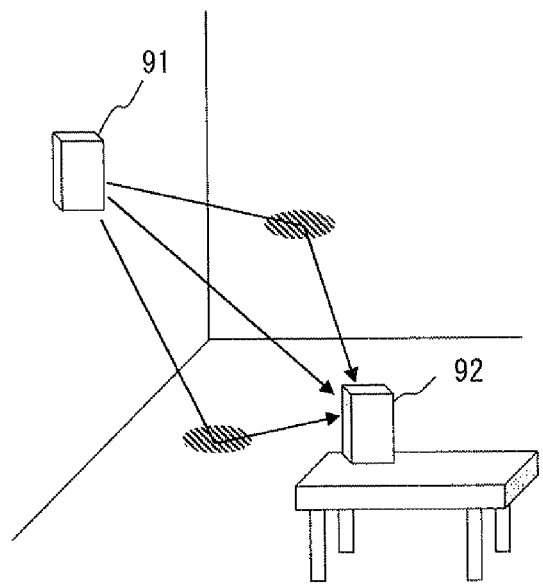
FIG. 11 shows a configuration of a system using wide-angle antennas.
Figure 12:
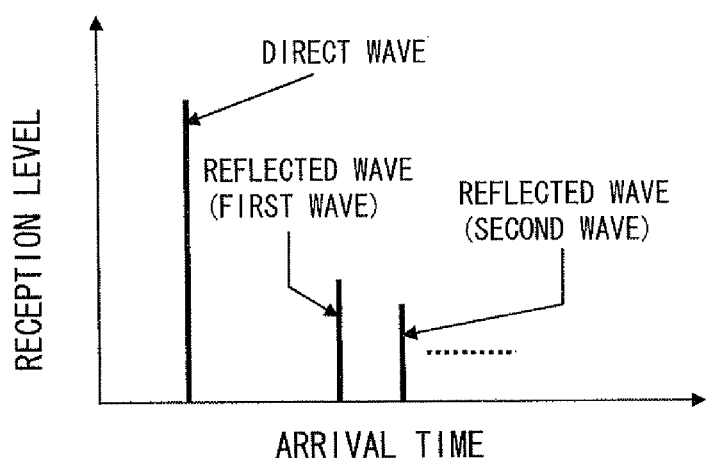
FIG. 12 shows an example of a delay profile of a system using wide-angle antennas when the system is used indoors.

Further, in millimeter wave communication, a local reflection may sometimes create a propagation path. FIG. 10 shows an aspect of such a situation. In FIG. 10A, there are a transceiver 81 and a receiver 82, and it is assumed that there are propagation paths in the beam forming including a direct wave A, a locally reflected wave B, and a reflected wave C propagating through a long path. There is a possibility that the direct wave A and the locally reflected wave B are blocked at the same time, for example, by a human body (FIG. 10B). To cope with this problem, Patent literature 1 discloses a technique to give no or a low priority to a beam direction close to another beam direction to which a priority is already assigned. Although examples in which priority order is assigned to antenna-setting pairs in the order of received power (or other communication quality) has been described so far in the above explanation, it is also possible to take angular relations between beam candidates into account in addition to the criterion based on the received power in the assignment of the priority order. Since information about angular relations between beam candidates in the respective communication devices is already obtained in this exemplary embodiment, it is possible to perform the priority order assignment like this.

In the above explanation, an omni pattern or a quasi-omni pattern is used as the radiation pattern of an antenna of a communication device in some of the steps. However, when it is difficult to generate an omni or quasi-omni pattern, other fixed patterns may be used as a substitute. However, it is necessary to use a radiation pattern having an antenna gain over a sufficiently wide angular range. If the radiation pattern of an antenna is known in advance, a process of eliminating the effects caused by the directional dependence of the antenna gain of the fixed pattern beam from the received data obtained in the steps S102, S108 and S109 shown in FIG. 1 may be added. Further, if necessary, a data string describing the directional dependence of the antenna gain of a fixed pattern beam may be transmitted between the communication devices.

Further, there are cases where it is difficult to implement a quasi-omni pattern over the entire desired angular range depending on the conditions of such as the type and the structure of used antenna and the frequency band. In such cases, the quasi-omni pattern may be divided into an appropriate number of angular ranges, and the transmission process or the reception process of a training signal may be repeatedly performed for each of the divided angular ranges.

In the above explanation, beam forming between two communication devices is explained. Such operations are often performed between two communication devices in a system including three or more communication devices. In general, there is a communication device having special authority called "Piconet coordinator" or "access point" in the system. The decision on which two communication devices perform a beam forming operation therebetween among the three or more communication devices is typically made by instructions from this communication device called "Piconet coordinator" or "access point". The Piconet coordinator or the access point may receive requests from other general communication devices and issue these instructions.

Further, in this exemplary embodiment, the roles of two communication devices are interchanged and then similar processes are performed therebetween. The decision on which of the two communication devices performs which of the roles before the other communication device may be also made by instructions from the communication device called "Piconet coordinator" or "access point".

Further, although expressions such as "to operate a communication device for reception" and "to generate an omni (nondirectional) or quasi-omni (quasi-nondirectional) pattern" are used in the above explanation, these processes may be, in general, performed in accordance with a program that are incorporated in advance into the process/arithmetic circuits or the like of the respective transceivers.

Second Exemplary Embodiment

Figure 6:
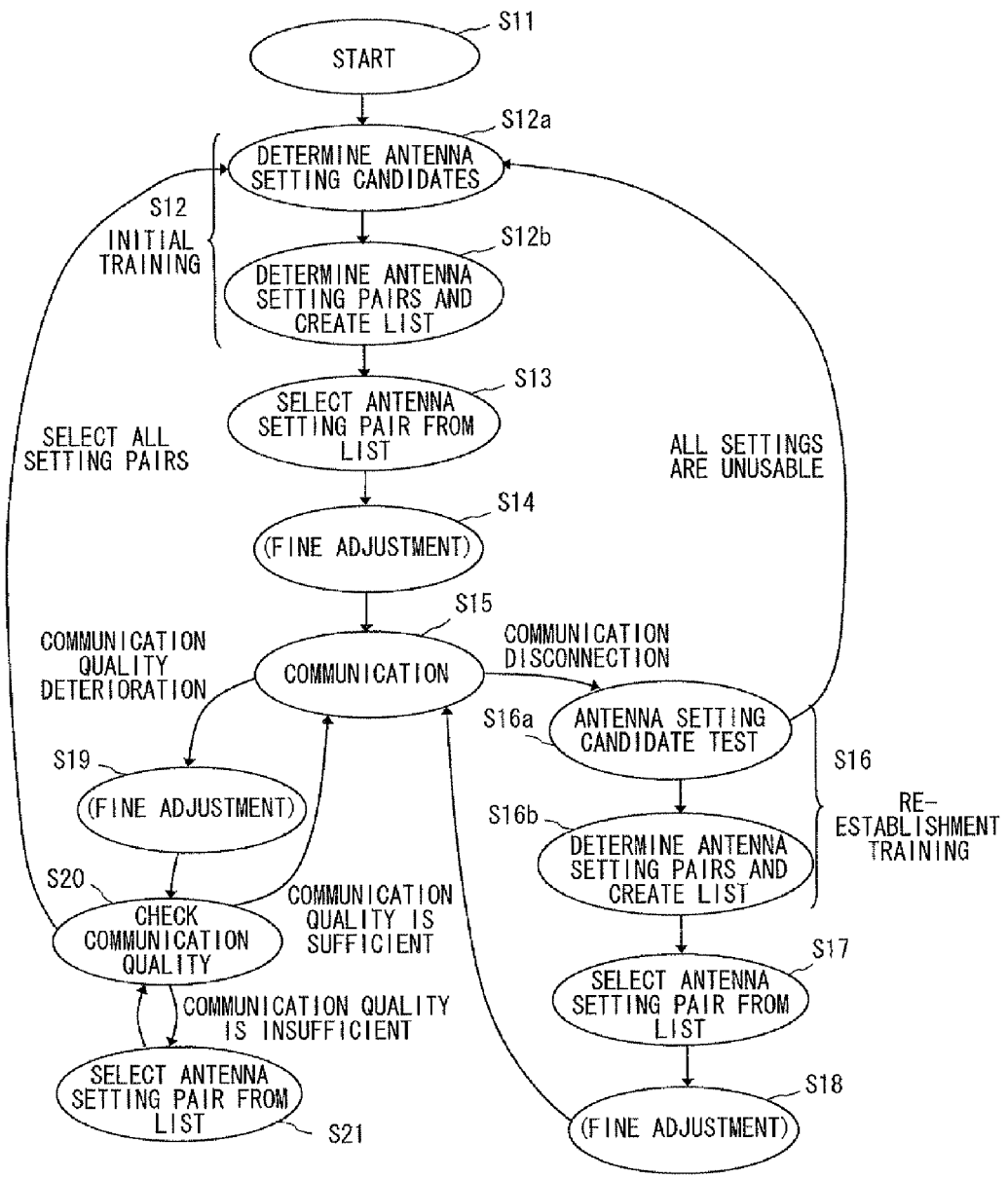
FIG. 6 shows transitions in a radio control procedure according to a second exemplary embodiment of the present invention.

A second exemplary embodiment according to the present invention is explained with reference to a transition diagram shown in FIG. 6. Note that the configuration of a radio communication system according to this exemplary embodiment may be similar to that of the first exemplary embodiment shown in FIG. 3. Each of states S11 to S18 and transition conditions therebetween in FIG. 6 are similar to the states assigned with the same signs and their transition conditions shown in FIG. 5 described above with the first exemplary embodiment. Therefore, detailed explanation of the states S11 to S18 is omitted.

In the first exemplary embodiment, the same process is carried out for both when the communication is disconnected and when the communication quality is deteriorated. However, the training for re-establishing the link (S16) described above in the first exemplary embodiment is especially effective when the communication is disconnected and the time synchronization between the communication devices thereby cannot be sufficiently maintained. On the other hand, when the communication quality is deteriorated, the link can be re-established by a simpler method because the time synchronization between the communication devices is maintained. This exemplary embodiment shows an example in which when deterioration in the communication quality is detected, a different process from that for the communication disconnection is performed.

When the deterioration in the communication quality is detected, the communication device 1 and 2 make a fine adjustment to the antenna setting (S19) and then check the communication quality (S20). When the communication quality is restored to a sufficient level for the communication by the fine adjustment, the procedure returns to the communication state (S15). When the communication quality is not restored to a sufficient level for the communication by the fine adjustment, they select another antenna-setting pair from the antenna-setting pair list stored in the state S12b (S21) and then check the communication quality again (S20). When the communication quality is restored to a sufficient level for the communication, the procedure returns to the communication state (S15). When the communication quality is insufficient, they select another antenna-setting pair from the antenna-setting pair list again (S21) and repeat a similar process. If sufficient communication quality cannot be obtained by any of the stored antenna-setting pairs, the procedure returns to the initial training S12a.

By taking different measures for the communication disconnection and for the communication quality deterioration as described above, it is possible to achieve more efficient link re-establishment.

Third Exemplary Embodiment

A third exemplary embodiment according to the present invention is explained with reference to a sequence diagram shown in FIG. 8. The steps shown in this sequence diagram are inserted between the end of FIG. 7A and the top of FIG. 7B. That is, the procedure may be carried out in the order of FIG. 7A, FIG. 8 and FIG. 7B.

Figure 8:
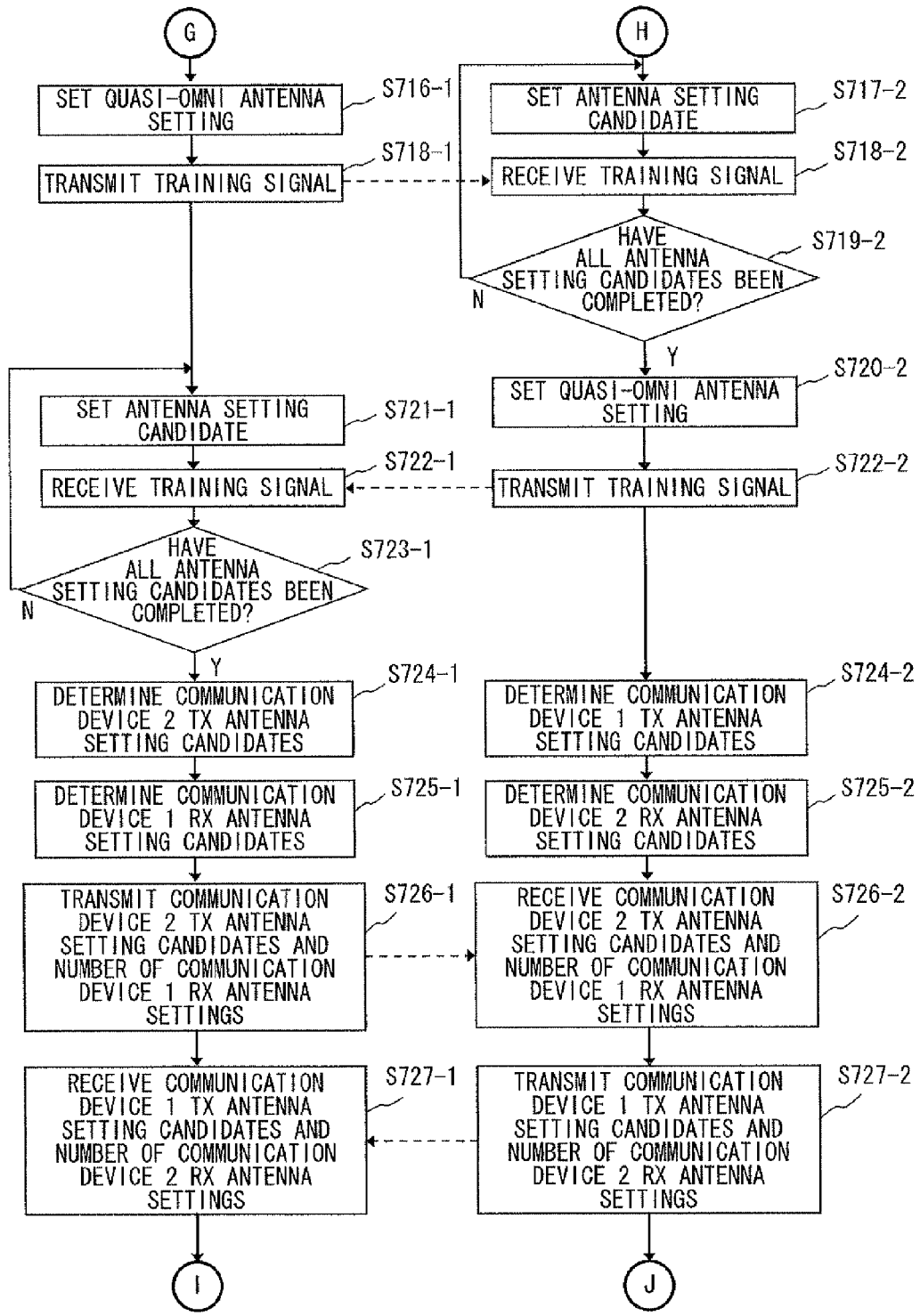
FIG. 8 is a sequence diagram showing a part of an operation of a communication device in a radio control procedure according to a seventh exemplary embodiment of the present invention.

An operation performed in steps S716 to s719 in FIG. 8 is explained. Firstly, the communication device 1 sets the transmitting-antenna setting with values for generating a quasi-omni pattern (S716-1) and sends out training signal (S718-1). The communication device 2 repeatedly receives the training signal (S718-2) while changing the receiving-antenna setting (S717-2) until signal receptions in all or some of the antenna settings detected and determined in the step S702 have been completed (S719-2).

Processes in steps S720 to S723 are similar to those in the above-described steps S716 to S719 except that the roles of the communication device 1 and 2 are interchanged, and therefore their explanation is omitted.

That is, in this exemplary embodiment, communication quality tests are carried out with combinations of all or some of the antenna-setting candidates detected and determined in the step S702 and a quasi-omni pattern for all of the transmitting antenna of the communication device 1 (S708 to S711)), the transmitting antenna of the communication device 2 (S712 to S715)), the receiving antenna of the communication device 2 (S716 to S719)), and the receiving antenna of the communication device 1 (S720 to S723)). All of these four communication quality tests may be carried out as explained in this exemplary embodiment. Alternatively, only a given one, two, or three of these four communication quality tests may be carried out. The first exemplary embodiment corresponds to a case where only first two tests are carried out. A given one test (test for one antenna) may be performed for the transmitting antenna of one of the communication devices or the receiving antenna of the other communication device for the one-way communication path in which deterioration in the communication quality is detected. Further, two tests (tests for two antennas) may be performed for the transmitting antenna of one of the communication devices and the receiving antenna of the other communication device for the one-way communication path in which deterioration in the communication quality is detected.

Further, in this exemplary embodiment, new antenna-setting candidates are determined for each of the transmitting antenna of the communication device 1, the transmitting antenna of the communication device 2, the receiving antenna of the communication device 2, and the receiving antenna of the communication device 1, based on the results of the above-described four communication tests in the steps S724 and S725. That is, an antenna setting(s) that does not satisfy a certain communication quality as a result of the above-described four communication tests among the all or some of the antenna settings detected and determined in the step S702 are excluded from the antenna-setting candidates. Further, to reflect their results in the round-robin trainings performed in FIG. 7B, necessary information is transferred (S726 and S727). The procedure like this can be applied not only to this exemplary embodiment in which the four communication tests are performed but also to the first and second exemplary embodiments in which part of the communication tests is performed.

Fourth Exemplary Embodiment

Figure 9A:
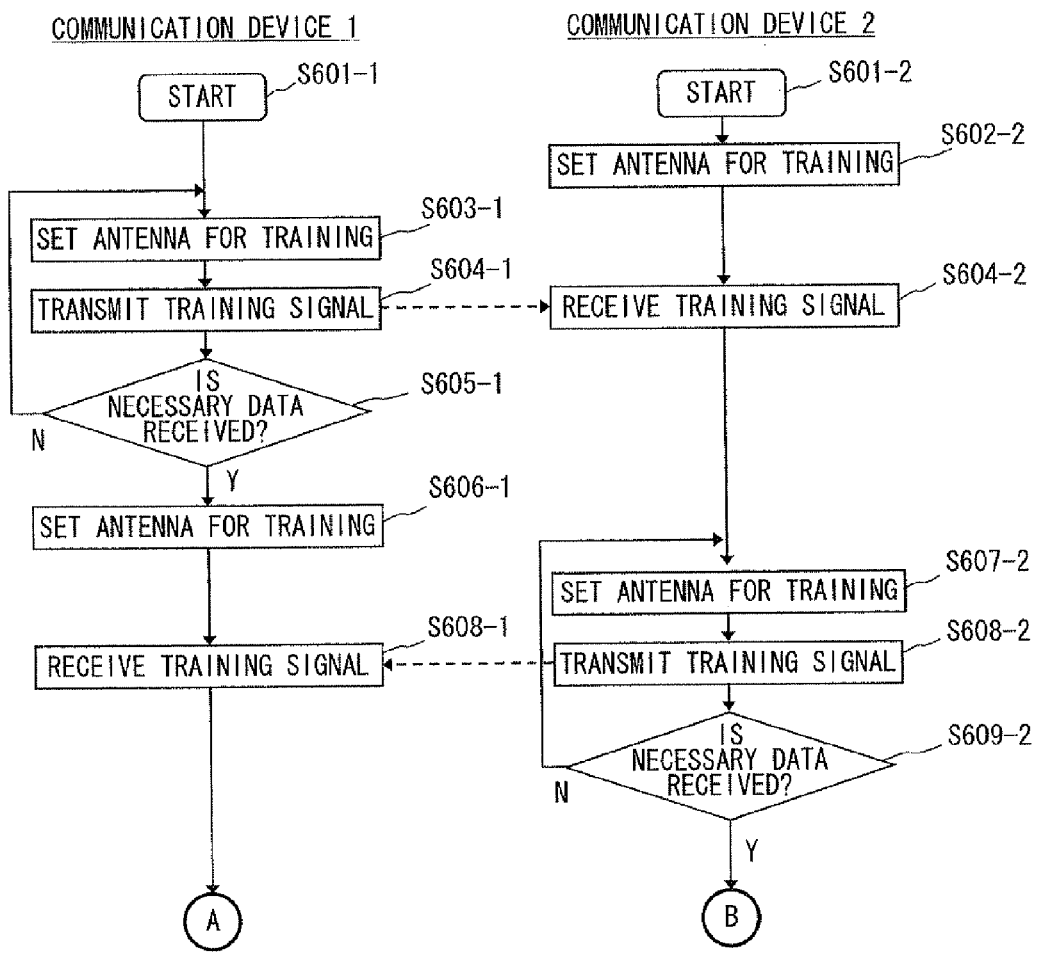
FIG. 9A is a sequence diagram showing an operation of a communication device performed before radio communication is started in a radio control procedure according to the present invention.
Figure 9B:
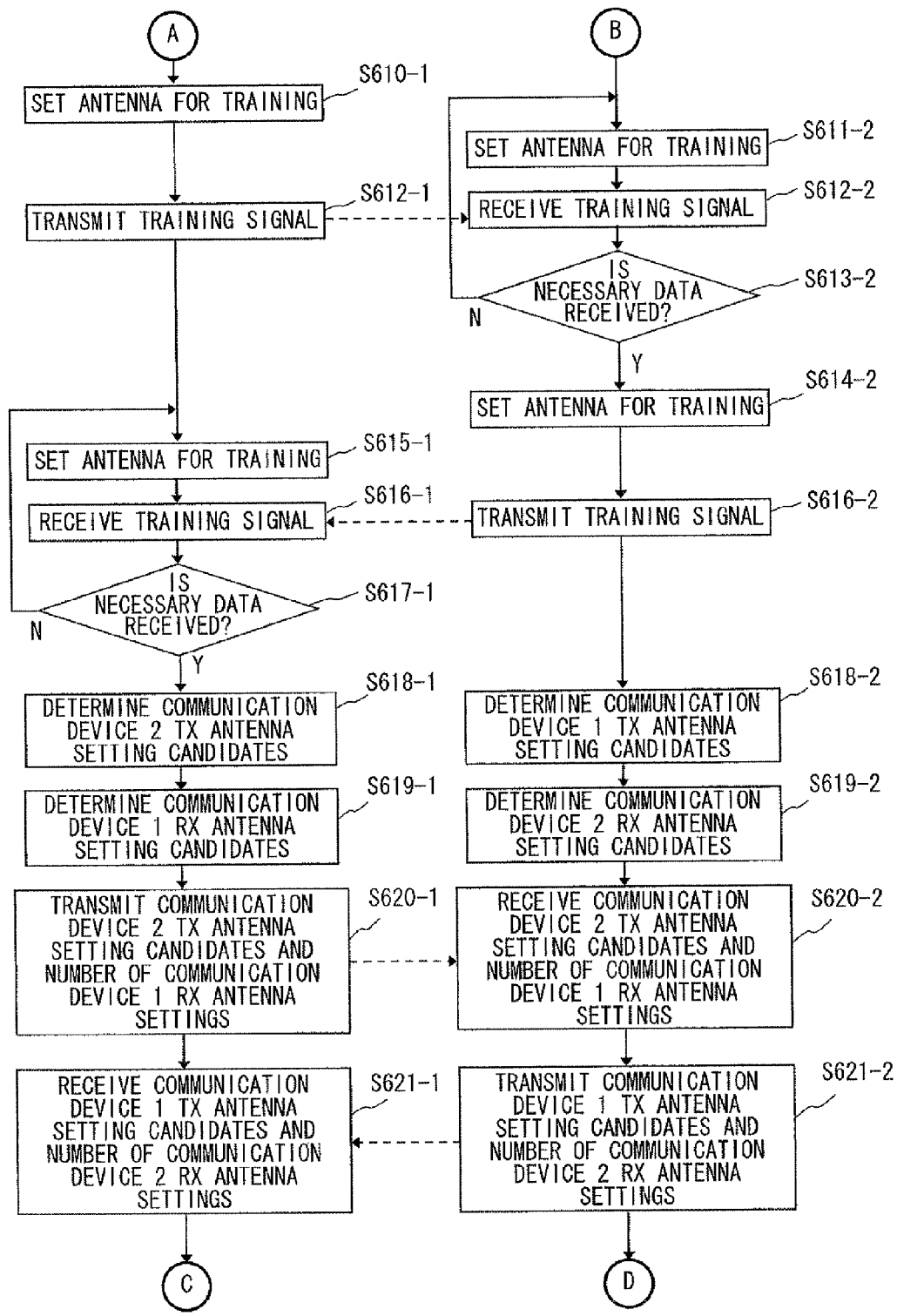
FIG. 9B is a sequence diagram showing an operation of a communication device performed before radio communication is started in a radio control procedure according to the present invention.
Figure 9C:
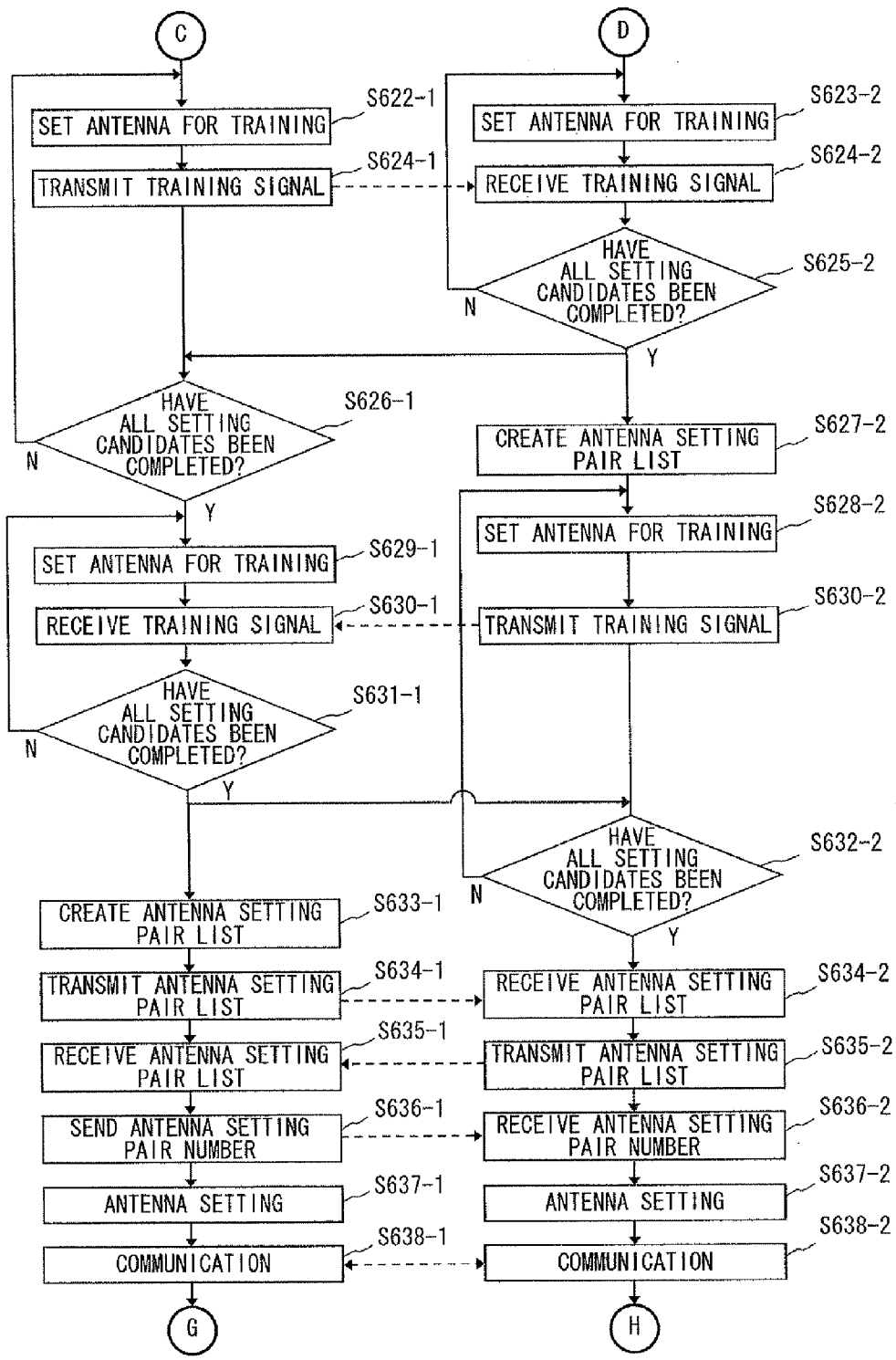
FIG. 9C is a sequence diagram showing an operation of a communication device performed before radio communication is started in a radio control procedure according to the present invention.

A fourth exemplary embodiment according to the present invention is explained with reference to a sequence diagram shown in FIGS. 9A to 9C. The procedure shown in this sequence diagram shows an example of a specific procedure of the process from the initial training to the start of communication, i.e., the steps S101 to S105 shown in FIG. 1 or the steps S701 to S705 shown in FIG. 7A.

Firstly, steps S602 to S605 are explained. The communication device 2 sets the receiving-antenna setting with values for a training, i.e., values for generating a quasi-omni pattern in this example (S602-2). The communication device 1 repeatedly transmits training signal (S604-1) while changing the transmitting-antenna setting (S603-1) until signal transmissions in all of the predetermined antenna settings have been completed (S605-1). In this process, identification number corresponding to each antenna setting or equivalent information is transmitted. The communication device 2 receives the training signal and the antenna setting identification number (S604-2).

Processes in steps S606 to S609 are similar to those in the above-described steps S602 to S605 except that the roles of the communication device 1 and the communication device 2 are interchanged, and therefore their explanation is omitted.

Next, steps S610 to S613 are explained. The communication device 1 sets the transmitting-antenna setting with values for a training, i.e., values for generating a quasi-omni pattern in this example (S610-1) and sends out a training signal (S612-1). The communication device 2 repeatedly receives the training signal (S612-2) while changing the receiving-antenna setting (S611-2) until signal receptions in all of the predetermined antenna settings have been completed (S613-2).

Processes in steps S614 to S617 are similar to those in the above-described steps S610 to S613 except that the roles of the communication device 1 and the communication device 2 are interchanged, and therefore their explanation is omitted.

In steps S618 and S619, four plurality of antenna-setting candidates, available for the communication, of the transmitting antenna of the communication device 1, the transmitting antenna of the communication device 2, the receiving antenna of the communication device 2, and the receiving antenna of the communication device 1 are determined by using the reception signal characteristics obtained in the above-described four groups of steps (S602 to S605, S606 to S609, S610 to S613, and S614 to S617). Further, in steps S620 and S621, information necessary for performing round-robin trainings for combinations of the antenna-setting candidates between the communication devices in a step S622 and subsequent steps is transferred.

In steps S622 to S626, round-robin trainings (communication quality tests) are performed between the transmitting-antenna-setting candidates of the communication device 1 that are determined in the step S618-2 by using the training signal reception results obtained in the steps S602 to S605 and the receiving-antenna-setting candidates of the communication device 2 that are determined in the step S619-2 by using the training signal reception results obtained in the steps S610 to S613.

Firstly, the communication device 1 sets the first antenna setting among the transmitting-antenna-setting candidates (S622-1) and sends a training signal (S624-1). The communication device 2 repeatedly receives the training signal (S624-2) while successively setting the receiving-antenna setting to each one of the antenna-setting candidates determined in the step S619-2 (S623-2) until signal receptions in all the antenna-setting candidates have been completed (S625-2). The above-described procedure is repeated until the procedure has been completed for all of the transmitting-antenna-setting candidates of the communication device 1 determined in the step S618-2 (S626-1).

In steps S627 to S632, round-robin trainings (communication quality tests) are performed between the transmittingantenna-setting candidates of the communication device 2 that are determined in the step S618-1 by using the training signal reception results obtained in the steps S606 to S609 and the receiving-antenna-setting candidates of the communication device 1 that are determined in the step S619-1 by using the training signal reception results obtained in the steps S614 to S617. These operations are similar to those in the above-described steps S622 to S626 except that the roles of the communication device 1 and the communication device 2 are interchanged, and therefore their explanation is omitted.

By performing these round-robin trainings, appropriate combinations between antenna-setting candidates (i.e. antenna-setting pairs) are found, and they are arranged in descending order of their communication quality (e.g., descending order of received power) (S633). The obtained data string of the antenna-setting pairs arranged according to the communication quality is called "antenna-setting pair list". The communication devices 1 and 2 select an antenna-setting pair from the antenna-setting pair list and start the communication (S634 to S638).

When the procedure from the initial training to the start of communication according to this exemplary embodiment is used, there is an advantage that the training for re-establishing the link (S108 to S111) can be implemented while omitting or simplifying part of the procedure by using the same scheme as the initial training (S102 and S103). For example, the process performed in the steps S108 and S109 shown in FIG. 1 in which one side is set with a quasi-omni pattern is equivalent to a process obtained by omitting part of groups of steps of the process in the steps S602 to S617 and reducing the number of antenna settings to be changed. Further, the round-robin trainings performed in the steps S110 and S111 shown in FIG. 1 is equivalent to the process of the steps S622 and S623 in the initial training or a process obtained by reducing the number of antenna settings to be changed. This capability of performing the process by using the same scheme means that the frames to be used and the like can be shared. Therefore, it provides an advantage that the overall protocol including the initial training and the re-establishment training can be simplified.

Note that the procedure from the initial training to the start of communication described above in this exemplary embodiment is merely an example. The present invention can be applied to any type of procedure from the initial training to the start of communication, provided that the procedure includes detecting a plurality of antenna-setting pairs.

Fifth Exemplary Embodiment

A fifth exemplary embodiment is characterized in that the initial training and the link re-establishment training are performed at a low rate (with a narrow band) and actual communication is performed at a relatively high rate (with a wide band). Alternatively, it is characterized in that parts of the initial training and the link re-establishment training are performed at a low rate (with a narrow band) and the remaining part of the initial training and the link re-establishment training as well as the actual communication are performed at a relatively high rate (with a wide band). The other operations may be performed by using the method according to one of the first to fourth exemplary embodiments.

In millimeter wave communication, since free space propagation losses are large, the received power is expected to be small. Therefore, if an antenna is set so as to generate an omni or quasi-omni pattern in the training, there is a possibility that a sufficient CNR (Carrier to Noise Ratio) is not achieved. Accordingly, it is expected that the use of the low rate (narrow band) having better reception sensitivity provides advantageous effects such as making the training possible and improving the accuracy. It should be noted that the "use of low rate (narrow band)" means to narrow the frequency band used to transmit a training signal in order to narrow the noise bandwidth or to adopt a modulation technique having a small necessary CNR. Note that "to adopt a modulation technique having a small necessary CNR" means, in other words, to adopt a modulation technique in which the distance between signal points on the constellation is large (typically a smaller transmission rate). It should be noted that it is assumed that a narrow beam width is used in this exemplary embodiment. Therefore, there is no significant difference in optimal beam combinations (antenna-setting pairs) regardless of whether the transmission is preformed at a low rate (narrow band) or at a high rate (wide band) because the correlative bandwidth is wide.

Other Exemplary Embodiments

In the first to fifth exemplary embodiments, examples in which each of the transceivers 400 and 500 includes both the transmitting antenna (405-1 to 405-M, or 505-1 to 505-K) and the receiving antenna (411-1 to 411-N, or 511-1 to 511-L) are shown. However, each of the transceivers 400 and 500 may include one common antenna that is used for both transmission and reception.

Further, in the first to fifth exemplary embodiments, examples in which when deterioration in the communication quality (including communication disconnection) occurs, a training signal is transmitted and received between the two communication devices in a state where one of the communication devices selects a fixed beam pattern (e.g., quasi-omni pattern) and the other communication device switches the antenna setting (e.g. beam direction or beam pattern) successively from one antenna setting to another among the plurality of antenna-setting candidates, and by doing so, the link is reliably re-established are shown (for example, S16*a* in FIG. 5, and S108 and S109 in FIG. 1). Further, in the first to fifth exemplary embodiments, examples in which the antenna-setting pair are updated (i.e. antenna-setting pair list is reconstructed) by performing round-robin trainings between a plurality of transmitting-antenna-setting candidates and a plurality of receiving-antenna-setting candidates after the link re-establishment (for example, S16*b* in FIG. 5, and S110 to S112 in FIG. 1). By performing the procedure for updating the antenna-setting pairs, it is possible to select new antenna-setting pairs having good communication quality to conform to changes in the communication environment.

However, the procedure for determining an antenna-setting pair that is used when the communication is resumed after the link re-establishment (for example, S16*a* in FIG. 5, and S108 and S109 in FIG. 1) can be modified as appropriate. That is, the round-robin trainings (for example, S16*b* in FIG. 5, and S110 to S112 in FIG. 1) do not necessarily have to be performed. For example, the transceivers 400 and 500 may resume the communication by selecting an antenna-setting pair associated with one of the antenna-setting candidates whose validity was verified in the steps S108 and S109 shown in FIG. 1 (i.e., antenna-setting pair that was already obtained in the initial training (for example, S12 in FIG. 5 and S103 in FIG. 1)). Alternatively, communication quality tests may be performed for all or some of the antenna-setting pairs determined in the step S103 shown in FIG. 1, and then the communication may be resumed by selecting an antenna-setting pair based on their results.

Further, the term "communication quality" has been used in the above-described first to fifth exemplary embodiments. The communication quality may be any value representing communication quality such as a received-signal level, a signal to noise ratio (SNR), a bit error rate (BER), a packet error rate (PER), and a frame error rate (FER), and one or more than one of them may be used. Further, a certain data string in a preamble contained in a transmission data string of the transmitter 401 or transmitter 501 may be used for the communication quality evaluation.

Further, controls and arithmetic operations for the generating and switching of antenna-setting candidates that are performed in the communication devices 400 and 500 in the above-described first to fifth exemplary embodiments can be implemented using a computer(s), as a microprocessor(s), to execute a program(s) for transceiver controls. Similarly, controls and arithmetic operations for the generation/switching of antenna-setting candidates that are performed in the transceiver 500 in the above-described first to fifth exemplary embodiments can be also implemented by executing computer programs for transceiver controls in computers such as microprocessors.

Further, in addition to the process/arithmetic circuits 406 and 506, part of the transmitter circuits 403 and 503 (modulation process and the like), part of the receiver circuits 409 and 509 (demodulation process and the like), and components relating to digital signal processing or device control of the control circuits 407 and 507 and the like may be implemented by a computer(s) such as a microcomputer(s) or a DSP(s) (Digital Signal Processor). Further, the so-called "software-antenna technology" may be applied to the transceivers 400 and 500. Specifically, the antenna setting circuits 404, 410, 504 and 510 may be constructed by digital filters, or a computer(s) such as a DSP(s).

In the above explanation, situations where communication is performed between two transceivers are explained as examples. However, the present invention is applicable to other situations where three or more transceivers perform communication.

Further, the present invention is not limited to the above-described exemplary embodiments, and needless to say, various modifications can be made without departing from the spirit and scope of the present invention described above.

This application is based upon and claims the benefit of priority from Japanese patent application No. 2009-253119, filed on Nov. 4, 2009, the disclosure of which is incorporated herein in its entirety by reference.

REFERENCE SIGNS LIST

400, 500 TRANSCEIVER
401, 801, 81, 91 TRANSMITTER
402, 502, 82, 92 RECEIVER
403, 503 TRANSMITTER CIRCUIT
404 ANTENNA SETTING CIRCUIT
404-1 to 404-M, 504-1 to 504-K AWV (ARRAY WEIGHT VECTOR) CONTROL CIRCUIT
405-1 to 405-M, 505-1 to 505-K TRANSMISSION RADIATING ELEMENT
406, 506 PROCESS/ARITHMETIC CIRCUIT
407, 507 CONTROL CIRCUIT
408, 508 STORAGE CIRCUIT
409, 509 RECEIVER CIRCUIT
410 ANTENNA SETTING CIRCUIT
410-1 to 410-N, 510-1 to 510-L AWV (ARRAY WEIGHT VECTOR) CONTROL CIRCUIT
411-1 to 411-N, 511-1 to 511-L RECEPTION RADIATING ELEMENT
413, 513 CONTROL CIRCUIT
414 ANTENNA SETTING CIRCUIT
414-1 to 414-M SWITCH
415-1 to 415-M TRANSMISSION RADIATING ELEMENT
416 ANTENNA SETTING CIRCUIT
416-1 to 416-N SWITCH
417-1 to 417-N RECEPTION RADIATING ELEMENT
83 BEAM PATTERN (IMAGE)
84, 85 REFLECTOR
86 HUMAN BODY
61 WALL
62 REFLECTOR

The invention claimed is:

1. A control method of a radio communication system comprising first and second communication devices, wherein
the first communication device is configured to control a transmission beam direction of a first transmitting antenna by changing transmitting-antenna setting and to control a reception beam direction of a first receiving antenna by changing receiving-antenna setting,
the second communication device is configured to control a transmission beam direction of a second transmitting antenna by changing transmitting-antenna setting and to control a reception beam direction of a second receiving antenna by changing receiving-antenna setting, and
the method comprises:
(a) determining, by an initial training performed between the first and second communication devices, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for the second transmitting antenna, and a plurality of second receiving-antenna-setting candidates for the second receiving antenna;
(b) determining, in the initial training and based on the at least one of four pluralities, at least one first antenna-setting pair for the first transmitting antenna and the second receiving antenna, and determining at least one second antenna-setting pair for the first receiving antenna and the second transmitting antenna;
(c) initiating, after the initial training including the operations (a) and (b), radio communication between the first and second communication devices using one of the at least one first antenna-setting pair and one of the at least one second antenna-setting pair, and detecting disconnection of communication or deterioration in communication quality of the radio communication between the first and second communication devices; and
(d) when the disconnection of communication or the deterioration in communication quality is detected, performing a link re-establishment training including at least one of following operations (d1), (d2), (d3) and (d4) without re-performing the initial training including the operations (a) and (b):
(d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;
(d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;

(d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and (d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

2. The control method of a radio communication system according to claim 1, further comprising:

(e) when the communication path in which communication quality deterioration is detected in the operation (c) is a communication path including the first transmitting antenna and the second receiving antenna, measuring communication quality for all combinations of at least some of the plurality of first transmitting-antenna-setting candidates and at least some of the plurality of second receiving-antenna-setting candidates on a round-robin basis after the operation (d);

(f) updating the at least one first antenna-setting pair based on communication quality measured in the operation (e); and (g) resuming radio communication between the first and second communication devices by using one of the at least one updated first antenna-setting pair or an antenna-setting pair obtained by making a fine adjustment thereto.

3. The control method of a radio communication system according to claim 2, further comprising updating the at least one second antenna-setting pair trough a same procedure as that in the operations (e) and (f).

4. The control method of a radio communication system according to claim 2, wherein a priority rank is assigned to each of the at least one updated first antenna-setting pair in descending order of communication quality, and radio communication is resumed by using an antenna-setting pair having a highest priority rank.

5. The control method of a radio communication system according to claim 1, wherein antenna-setting candidates used for transmission or reception of the training signal in at least one of the operations (d1), (d2), (d3) and (d4) is limited to the plurality of first transmitting and receiving-antenna-setting candidates determined in the operation (b) or the plurality of second transmitting and receiving-antenna-setting candidates.

6. The control method of a radio communication system according to claim 2, wherein an antenna setting candidate that is determined to be incapable of continuing communication in at least one of the operations (d1), (d2), (d3) and (d4) is excluded from the antenna-setting candidates whose communication quality is to be measured in the operation (e).

7. The control method of a radio communication system according to claim 1, further comprising re-generating the at least one first antenna-setting pair and the at least one second antenna-setting pair by performing the operations (a) and (b) again after the operation (d).

8. The control method of a radio communication system according to claim 1, wherein the fixed beam pattern is divided into a plurality of fixed beam patterns and the training signal is repeatedly received or transmitted for each of the divided fixed beam patterns in at least one of the operations (d1), (d2), (d3) and (d4).

9. The control method of a radio communication system according to claim 1, wherein time synchronization between the first and second communication devices is established or the first and second communication devices are synchronized by using an antenna setting candidate that is determined to be capable of continuing communication in the operation (d).

10. The control method of a radio communication system according to claim 1, wherein
the operation (a) comprises:
(a1) transmitting a training signal from the first transmitting antenna while changing antenna setting of the first transmitting antenna;
(a2) receiving the training signal by the second receiving antenna in a state where the second receiving antenna is set with a fixed beam pattern;
(a3) obtaining a data string describing a relation between antenna setting of the first transmitting antenna and a reception signal characteristic of the second receiving antenna based on a reception result of a training signal obtained in the operation (a2);
(a4) determining the plurality of first transmitting-antenna-setting candidates, which serve as candidates to be used for communication, of the first transmitting antenna by using the data string;
(a5) determining the plurality of second transmitting-antenna-setting candidates, which serve as candidates to be used for communication, of the second transmitting antenna, by performing the operations (a1) to (a4), which were performed by using the first transmitting antenna and the second receiving antenna, for a combination of the second transmitting antenna and the first receiving antenna;
(a6) transmitting a training signal from the first transmitting antenna in a state where the first transmitting antenna is set with a fixed beam pattern;
(a7) receiving the training signal by the second receiving antenna while changing antenna setting of the second receiving antenna;
(a8) obtaining a data string describing a relation between antenna setting and a reception signal characteristic of the second receiving antenna based on a reception result of a training signal obtained in the operation (a7);
(a9) determining the plurality of second receiving-antenna-setting candidates, which serve as candidates to be used for communication, of the second receiving antenna by using the data string obtained in the operation (a8); and
(a10) determining the plurality of first receiving-antenna-setting candidates, which serve as candidates to be used for communication, of the first receiving antenna, by performing the operations (a6) to (a9), which were performed by using the first transmitting antenna and the second receiving antenna, for a combination of the second transmitting antenna and the first receiving antenna, and
the operation (b) comprises:
(b1) measuring communication quality for all or some of combinations between the plurality of first transmitting-antenna-setting candidates and the plurality of second receiving-antenna-setting candidates, and for all or some of combinations between the plurality of first receiving-antenna-setting candidates and the plurality of second transmitting-antenna-setting candidates; and (b2) determining the at least one first antenna-setting pair and the at least one second antenna-setting pair based on the measured communication quality.

11. The control method of a radio communication system according to claim 10, wherein: the operation (a1) includes scanning a transmission beam direction of the first transmitting antenna by changing antenna setting of the first transmitting antenna; the operation (a5) includes scanning a transmission beam direction of the second transmitting antenna by changing antenna setting of the second transmitting antenna; the operation (a7) includes scanning a reception beam direction of the second receiving antenna by changing antenna setting of the second receiving antenna; and the operation (a10) includes scanning a reception beam direction of the first receiving antenna by changing antenna setting of the first receiving antenna.

12. The control method of a radio communication system according to claim 10, wherein the fixed beam pattern is divided into a plurality of fixed beam patterns and the training signal is repeatedly received or transmitted for each of the divided fixed beam patterns in at least one of four groups of operations including: the operations (a1) and (a2); operations in the operation (a5) corresponding to the operations (a1) and (a2); the operations (a6) and (a7); and operations in the operation (a10) corresponding to the operations (a6) and (a7).

13. The control method of a radio communication system according to claim 1, wherein the fixed beam pattern is an omni (nondirectional) pattern or quasi-omni (quasi-nondirectional) pattern.

14. The control method of a radio communication system according to claim 1, wherein the reception signal characteristic or the communication quality includes at least one of a received power, a signal to noise ratio (SNR), a bit error rate (BER), a packet error rate (PER), and a frame error rate (FER).

15. The control method of a radio communication system according to claim 1, wherein a radio wave containing a signal that is mainly used for data communication, and a radio wave having a smaller data transmission rate or a narrower transmission frequency band in comparison with the radio wave containing the signal are used; and a training or a part of a training is carried out by using the radio wave having the smaller data transmission rate or the narrower transmission frequency band.

16. A radio communication system comprising:
a first communication device configured to transmit a radio signal from a first transmitting antenna and to receive a radio signal by a first receiving antenna; and
a second communication device configured to transmit a radio signal from a second transmitting antenna and to receive a radio signal by a second receiving antenna, wherein
the first and second communication devices are further configured to perform a process of determining a transmitting-antenna-setting candidate and a receiving-antenna-setting candidate used for radio communication in a cooperative manner, the determination process includes:
(a) determining, by an initial training performed between the first and second communication devices, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for the second transmitting antenna, and a plurality of second receiving-antenna-setting candidates for the second receiving antenna;
(b) determining, in the initial training and based on the at least one of four pluralities, at least one first antenna-setting pair for the first transmitting antenna and the second receiving antenna, and determining at least one second antenna-setting pair for the first receiving antenna and the second transmitting antenna;
(c) initiating, after the initial training including the operations (a) and (b), radio communication between the first and second communication devices using one of the at least one first antenna-setting pair and one of the at least one second antenna-setting pair, and detecting disconnection of communication or deterioration in communication quality of the radio communication between the first and second communication devices; and
(d) when the disconnection of communication or the deterioration in communication quality is detected, performing a link re-establishment training including at least one of following operations (d1), (d2), (d3) and (d4) without re-performing the initial training including the operations (a) and (b):
(d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;
(d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;
(d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and
(d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

17. The radio communication system according to claim 16, wherein the determination process further includes:
(e) when the communication path in which communication quality deterioration is detected in the operation (c) is a communication path including the first transmitting antenna and the second receiving antenna, measuring communication quality for all combination of at least some of the plurality of first transmitting-antenna-setting candidates and at least some of the plurality of second receiving-antenna-setting candidates on a round-robin basis after the operation (d);
(f) updating the at least one first antenna-setting pair based on communication quality measured in the operation (e); and
(g) resuming radio communication between the first and second communication devices by using one of the at least one updated first antenna-setting pair or an antenna-setting pair obtained by making a fine adjustment thereto.

18. The radio communication system according to claim 17, wherein the determination process further includes updating the at least one second antenna-setting pair trough a same procedure as that in the operations (e) and (f).

19. The radio communication system according to claim 17, wherein a priority rank is assigned to each of the at least one updated first antenna-setting pair in descending order of communication quality, and radio communication is resumed by using an antenna-setting pair having a highest priority rank.

20. The radio communication system according to claim 16, wherein antenna-setting candidates used for transmission or reception of the training signal in at least one of the operations (d1), (d2), (d3) and (d4) is limited to the plurality of first transmitting and receiving-antenna-setting candidates or the plurality of second transmitting and receiving-antenna-setting candidates determined in the operation (b).

21. The radio communication system according to claim 16, wherein an antenna setting candidate that is determined to be incapable of continuing communication in at least one of the operations (d1), (d2), (d3) and (d4) is excluded from the antenna-setting candidates whose communication quality is to be measured in the operation (e).

22. The radio communication system according to claim 16, wherein the determination process further includes re-generating the at least one first antenna-setting pair and the at least one second antenna-setting pair by performing the operations (a) and (b) again after the operation (d).

23. The radio communication system according to claim 16, wherein the fixed beam pattern is divided into a plurality of fixed beam patterns, and the training signal is repeatedly received or transmitted for each of the divided fixed beam patterns in at least one of the operations (d1), (d2), (d3) and (d4).

24. The radio communication system according to claim 16, wherein time synchronization between the first and second communication devices is established or the first and second communication devices are synchronized by using an antenna setting candidate that is determined to be capable of continuing communication in the operation (d).

25. The radio communication system according to claim 16, wherein
the operation (a) comprises:
(a1) transmitting a training signal from the first transmitting antenna while changing antenna setting of the first transmitting antenna;
(a2) receiving the training signal by the second receiving antenna in a state where the second receiving antenna is set with a fixed beam pattern;
(a3) obtaining a data string describing a relation between antenna setting of the first transmitting antenna and a reception signal characteristic of the second receiving antenna based on a reception result of a training signal obtained in the operation (a2);
(a4) determining the plurality of first transmitting-antenna-setting candidates, which serve as candidates to be used for communication, of the first transmitting antenna by using the data string;
(a5) determining the plurality of second transmitting-antenna-setting candidates, which serve as candidates to be used for communication, of the second transmitting antenna, by performing a similar process to that performed in the operations (a1) to (a4) to determine the plurality of second transmitting-antenna-setting candidates, for a combination of the second transmitting antenna and the first receiving antenna;
(a6) transmitting a training signal from the first transmitting antenna in a state where the first transmitting antenna is set with a fixed beam pattern;
(a7) receiving the training signal by the second receiving antenna while changing antenna setting of the second receiving antenna;
(a8) obtaining a data string describing a relation between antenna setting and a reception signal characteristic of the second receiving antenna based on a reception result of a training signal obtained in the operation (a7);
(a9) determining the plurality of second receiving-antenna-setting candidates, which serve as candidates to be used for communication, of the second receiving antenna by using the data string obtained in the operation (a8); and
(a10) determining the plurality of first receiving-antenna-setting candidates, which serve as candidates to be used for communication, of the first receiving antenna, by performing a similar process to that performed in the operations (a6) to (a9) to determine the plurality of second receiving-antenna-setting candidates, for a combination of the second transmitting antenna and the first receiving antenna, and
the operation (b) comprises:
(b1) measuring communication quality for all or some of combinations between the plurality of first transmitting-antenna-setting candidates and the plurality of second receiving-antenna-setting candidates, and for all or some of combinations between the plurality of first receiving-antenna-setting candidates and the plurality of second transmitting-antenna-setting candidates; and
(b2) determining the at least one first antenna-setting pair and the at least one second antenna-setting pair based on the communication quality measured in the operation (b1).

26. The radio communication system according to claim 25, wherein: the operation (a1) includes scanning a transmission beam direction of the first transmitting antenna by changing antenna setting of the first transmitting antenna; the operation (a5) includes scanning a transmission beam direction of the second transmitting antenna by changing antenna setting of the second transmitting antenna; the operation (a7) includes scanning a reception beam direction of the second receiving antenna by changing antenna setting of the second receiving antenna; and the operation (a10) includes scanning a reception beam direction of the first receiving antenna by changing antenna setting of the first receiving antenna.

27. The radio communication system according to claim 25, wherein the fixed beam pattern is divided into a plurality of fixed beam patterns and the training signal is repeatedly received or transmitted for each of the divided fixed beam patterns in at least one of four groups of operations including: the operations (a1) and (a2); operations in the operation (a5) corresponding to the operations (a1) and (a2); the operations (a6) and (a7); and operations in the operation (a10) corresponding to the operations (a6) and (a7).

28. The radio communication system according to claim 16, wherein the fixed beam pattern is an omni (nondirectional) pattern or quasi-omni (quasi-nondirectional) pattern.

29. The radio communication system according to claim 16, wherein at least one of a transmitting antenna and a receiving antenna having a directivity control function of the first and second communication devices is a phased array antenna.

30. The radio communication system according to claim 29, wherein the antenna setting is setting of an array weight vector.

31. The radio communication system according to claim 16, wherein at least one of a transmitting antenna and a receiving antenna having a directivity control function of the first and second communication devices is a sector-selectable antenna.

32. The radio communication system according to claim 31, wherein the antenna setting is setting of a switch that selects a radiating element.

33. The radio communication system according to claim 16, wherein at least one of a transmitting antenna and a receiving antenna having a directivity control function of the first and second communication devices is a mechanical antenna.

34. The radio communication system according to claim 33, wherein the antenna setting is performed by a mechanical operation for an antenna direction.

35. The radio communication system according to claim 16, wherein the reception signal characteristic or the communication quality includes at least one of a received power, a signal to noise ratio (SNR), a bit error rate (BER), a packet error rate (PER), and a frame error rate (FER).

36. The radio communication system according to claim 16, wherein a radio wave containing a signal that is mainly used for data communication, and a radio wave having a smaller data transmission rate or a narrower transmission frequency band in comparison with the radio wave containing the signal are used; and a training or a part of a training is carried out by using the radio wave having the smaller data transmission rate or the narrower transmission frequency band.

37. A radio communication apparatus that performs radio communication with a corresponding device, comprising:
   a transmitting-antenna setting control unit that controls a transmission beam direction of a first transmitting antenna by changing transmitting-antenna setting;
   a receiving-antenna setting control unit that controls a reception beam direction of a first receiving antenna by changing receiving-antenna setting; and
   a processing unit that performs a process of determining a transmitting-antenna-setting candidate and a receiving-antenna-setting candidate, used for radio communication with a corresponding device, in a cooperative manner with the corresponding device, wherein
   the process of determining a transmitting and receiving-antenna setting candidate comprises:
   (a) determining, by an initial training performed between the radio communication apparatus and the corresponding device, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for a second transmitting antenna used for transmission performed by the corresponding device, and a plurality of second receiving-antenna-setting candidates for a second receiving antenna used for transmission performed by the corresponding device;
   (b) determining, in the initial raining and based on the at least one of four pluralities, at least one first antenna-setting pair for the first transmitting antenna and the second receiving antenna, and determining at least one second antenna-setting pair for the first receiving antenna and the second transmitting antenna;
   (c) initiating, after the initial training including the operations (a) and (b), radio communication between the radio communication apparatus and the corresponding device using one of the at least one first antenna-setting pair and one of the at least one second antenna-setting pair, and detecting disconnection of communication or deterioration in communication quality of the radio communication between the radio communication apparatus and the corresponding device; and
   (d) when the disconnection of communication or the deterioration in communication quality is detected, performing a link re-establishment training including at least one of following processes (d1), (d2), (d3) and (d4) without re-perforating the initial training including the operations (a) and (b):
   (d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;
   (d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;
   (d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and
   (d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

38. The radio communication apparatus according to claim 37, wherein the process of determining a transmitting and receiving-antenna setting candidate further comprises:
   (e) when the communication path in which communication quality deterioration is detected in the process (c) is a communication path including the first transmitting antenna and the second receiving antenna, measuring communication quality for all combination of at least some of the plurality of first transmitting-antenna-setting candidates and at least some of the plurality of second receiving-antenna-setting candidates on a round-robin basis after the process (d);
   (f) updating the at least one first antenna-setting pair based on communication quality measured in the process (e); and
   (g) resuming radio communication between the radio communication apparatus and the corresponding device by using one of the at least one updated first antenna-setting pair or an antenna-setting pair obtained by making a fine adjustment thereto.

39. The radio communication apparatus according to claim 38, wherein the process of determining a transmitting and receiving-antenna setting candidate further comprises updating the at least one second antenna-setting pair trough a same procedure as that in the processes (e) and (f).

40. The radio communication apparatus according to claim 38, wherein the process of determining a transmitting and receiving-antenna setting candidate further comprises assigning a priority rank to each of the at least one updated first antenna-setting pair in descending order of communication quality, and resuming radio communication by using an antenna-setting pair having a highest priority rank.

41. The radio communication apparatus according to claim 37, wherein antenna-setting candidates used for transmission or reception of the training signal in at least one of the processes (d1), (d2), (d3) and (d4) is limited to the plurality of first transmitting and receiving-antenna-setting candidates determined in the process (b) or the plurality of second transmitting and receiving-antenna-setting candidates.

42. The radio communication apparatus according to claim 38, wherein an antenna setting candidate that is determined to be incapable of continuing communication in at least one of the processes (d1), (d2), (d3) and (d4) is excluded from the antenna-setting candidates whose communication quality is to be measured in the process (e).

43. The radio communication apparatus according to claim 37, wherein the process of determining a transmitting and receiving-antenna setting candidate further comprises re-generating the at least one first antenna-setting pair and the at least one second antenna-setting pair by performing the processes (a) and (b) again after the process (d).

44. A radio communication system comprising:
- a first communication device configured to transmit a radio signal from a first transmitting antenna and to receive a radio signal by a first receiving antenna;
- a second communication device configured to transmit a radio signal from a second transmitting antenna and to receive a radio signal by a second receiving antenna;
- first means for determining, by an initial training performed between the first and second communication devices, at least one of four pluralities including a plurality of first transmitting-antenna-setting candidates for the first transmitting antenna, a plurality of first receiving-antenna-setting candidates for the first receiving antenna, a plurality of second transmitting-antenna-setting candidates for the second transmitting antenna, and a plurality of second receiving-antenna-setting candidates for the second receiving antenna;
- second means for determining, in the initial training and based on the at least one of four pluralities, at least one first antenna-setting pair for the first transmitting antenna and the second receiving antenna, and determining at least one second antenna-setting pair for the first receiving antenna and the second transmitting antenna;
- third means for initiating, after the initial training by the first and second means, radio communication between the first and second communication devices using one of the at least one first antenna-setting pair and one of the at least one second antenna-setting pair, and for detecting disconnection of communication or deterioration in communication quality of the radio communication between the first and second communication devices; and
- fourth means for, when the disconnection of communication or the deterioration in communication quality is detected, a link re-establishment training including performing at least one of following operations (d1), (d2), (d3) and (d4) without re-performing the initial training including the operations (a) and (b):
- (d1) transmitting a first training signal from the first transmitting antenna while switching antenna setting of the first transmitting antenna among at least some of the plurality of first transmitting-antenna-setting candidates, and receiving the first training signal by the second receiving antenna set with a fixed beam pattern;
- (d2) transmitting a second training signal from the second transmitting antenna while switching antenna setting of the second transmitting antenna among at least some of the plurality of second transmitting-antenna-setting candidates, and receiving the second training signal by the first receiving antenna set with a fixed beam pattern;
- (d3) transmitting a third training signal from the first transmitting antenna set with a fixed beam pattern, and receiving the third training signal by the second receiving antenna while switching antenna setting of the second receiving antenna among at least some of the plurality of second receiving-antenna-setting candidates; and
- (d4) transmitting a fourth training signal from the second transmitting antenna set with a fixed beam pattern, and receiving the fourth training signal by the first receiving antenna while switching antenna setting of the first receiving antenna among at least some of the plurality of first receiving-antenna-setting candidates.

\* \* \* \* \*